(12) United States Patent
Voice et al.

(10) Patent No.: US 9,281,945 B2
(45) Date of Patent: Mar. 8, 2016

(54) OFFLINE METHODS FOR AUTHENTICATION IN A CLIENT/SERVER AUTHENTICATION SYSTEM

(75) Inventors: Chris Voice, Ottawa (CA); Marc Smith, Ottawa (CA); Murray McCulligh, Ottawa (CA); Robert Zuccherato, Ajax (CA)

(73) Assignee: Entrust, Inc., Dallas, TX (US)

( * ) Notice: Subject to any disclaimer, the term of this patent is extended or adjusted under 35 U.S.C. 154(b) by 2048 days.

(21) Appl. No.: 11/163,010

(22) Filed: Sep. 30, 2005

(65) Prior Publication Data

US 2006/0015725 A1    Jan. 19, 2006

Related U.S. Application Data

(63) Continuation-in-part of application No. 10/849,402, filed on May 19, 2004, which is a continuation-in-part of application No. 10/748,523, filed on Dec. 30, 2003.

(51) Int. Cl.
*H04L 9/32* (2006.01)
*G06F 21/00* (2013.01)
(Continued)

(52) U.S. Cl.
CPC .............. *H04L 9/3226* (2013.01); *H04L 9/3273* (2013.01); *H04L 63/0245* (2013.01); *H04L 63/08* (2013.01); *H04L 63/083* (2013.01); *H04L 63/0869* (2013.01); *H04L 63/104* (2013.01); *G06F 21/31* (2013.01); *G06F 2221/2103* (2013.01); *H04L 9/00* (2013.01); *H04L 2209/56* (2013.01); *H04L 2209/80* (2013.01)

(58) Field of Classification Search
CPC ...... H04L 63/08; H04L 9/3226; H04L 63/083; H04L 9/00; G06F 21/31; G06F 2221/2103
USPC .......... 713/168, 165, 181, 182; 726/4, 16, 17; 380/255, 28
See application file for complete search history.

(56) References Cited

U.S. PATENT DOCUMENTS 3,719,801 A    3/1973 Drexler
3,827,726 A    8/1974 McVoy et al.
(Continued)

FOREIGN PATENT DOCUMENTS

CA    2193819 C    1/1996
EP    1176489 A2   1/2002
(Continued)

OTHER PUBLICATIONS

The Anti-Phishing Working Group; Proposed Solutions to Address the Threat of Email Spoofing Scams; Dec. 2003; pp. 1-10.
(Continued)

*Primary Examiner* — Arvind Moorthy
(74) *Attorney, Agent, or Firm* — Faegre Baker Daniels LLP

(57) ABSTRACT

A method for providing authentication of a user of a recipient unit when the recipient unit is off-line includes storing one or a plurality of challenge-reply sets associated with an article based on an on-line communication with a sender unit. Each of the challenge-reply sets includes at least a challenge-reply pair for use in off-line authentication of the user for a particular resource available through the recipient unit. When the user is offline, the method includes selecting at least one of the plurality of stored challenge-reply sets for off-line authentication of the user for the particular resource available through the recipient unit.

54 Claims, 28 Drawing Sheets

(51) Int. Cl.

| | | |
|---|---|---|
| *G06F 7/04* | (2006.01) | |
| *H04K 1/00* | (2006.01) | |
| *H04L 9/28* | (2006.01) | |
| *H04L 29/06* | (2006.01) | |
| G06F 21/31 | (2013.01) | |
| H04L 9/00 | (2006.01) | |

(56) References Cited

U.S. PATENT DOCUMENTS

| | | | |
|---|---|---|---|
| 4,184,148 A | 1/1980 | Smagala-Romanoff | |
| 4,189,353 A | 2/1980 | Harriman | |
| 4,445,712 A | 5/1984 | Smagala-Romanoff | |
| 4,795,890 A | 1/1989 | Goldman | |
| 4,921,278 A | 5/1990 | Shiang et al. | |
| 4,936,778 A | 6/1990 | Setchell et al. | |
| 5,233,436 A | 8/1993 | Oksman et al. | |
| 5,246,375 A | 9/1993 | Goede | |
| 5,251,259 A | 10/1993 | Mosley | |
| 5,347,580 A | 9/1994 | Molva et al. | |
| 5,381,539 A * | 1/1995 | Yanai et al. | 711/133 |
| 5,491,752 A | 2/1996 | Kaufman et al. | |
| 5,537,571 A * | 7/1996 | Deville | 711/133 |
| 5,552,845 A | 9/1996 | Nagao et al. | |
| 5,712,627 A | 1/1998 | Watts | |
| 6,230,169 B1 | 5/2001 | Nagae | |
| 6,246,769 B1 | 6/2001 | Kohut | |
| 6,438,550 B1 | 8/2002 | Doyle et al. | |
| 6,732,277 B1 | 5/2004 | Vandergeest et al. | |
| 6,772,336 B1 * | 8/2004 | Dixon, Jr. | 713/165 |
| 6,784,905 B2 | 8/2004 | Brown et al. | |
| 6,934,838 B1 | 8/2005 | Boyce et al. | |
| 6,950,949 B1 | 9/2005 | Gilchrist | |
| 6,970,827 B2 * | 11/2005 | Zeltzer et al. | 705/2 |
| 6,975,727 B1 | 12/2005 | Vandergeest | |
| 6,980,081 B2 | 12/2005 | Anderson | |
| 7,100,049 B2 | 8/2006 | Gasparini et al. | |
| 2002/0010684 A1 | 1/2002 | Moskowitz | |
| 2002/0078350 A1 * | 6/2002 | Sandhu et al. | 713/168 |
| 2002/0081179 A1 * | 6/2002 | Vallstrom | 414/333 |
| 2002/0091938 A1 * | 7/2002 | Hiltunen et al. | 713/200 |
| 2003/0009670 A1 | 1/2003 | Rhoads | |
| 2003/0015866 A1 | 1/2003 | Cioffi et al. | |
| 2003/0028786 A1 | 2/2003 | Mustafa | |
| 2003/0141373 A1 | 7/2003 | Lasch et al. | |
| 2003/0154406 A1 | 8/2003 | Honarvar et al. | |
| 2003/0204743 A1 * | 10/2003 | Devadas et al. | 713/200 |
| 2003/0210127 A1 | 11/2003 | Anderson et al. | |
| 2003/0233546 A1 * | 12/2003 | Blom | 713/168 |
| 2004/0054863 A1 | 3/2004 | Harada et al. | |
| 2004/0078571 A1 | 4/2004 | Haverinen | |
| 2004/0093372 A1 | 5/2004 | Chen et al. | |
| 2004/0122960 A1 | 6/2004 | Hall et al. | |
| 2004/0187018 A1 * | 9/2004 | Owen et al. | 713/200 |
| 2004/0190718 A1 | 9/2004 | Dacosta | |
| 2004/0193910 A1 | 9/2004 | Moles | |
| 2004/0223619 A1 * | 11/2004 | Jablon | 380/277 |
| 2005/0033688 A1 | 2/2005 | Peart et al. | |
| 2005/0050328 A1 * | 3/2005 | Mizrah | 713/171 |
| 2005/0050330 A1 | 3/2005 | Agam et al. | |
| 2005/0097320 A1 | 5/2005 | Golan et al. | |
| 2005/0144449 A1 | 6/2005 | Voice | |
| 2005/0144450 A1 | 6/2005 | Voice | |
| 2005/0144451 A1 | 6/2005 | Voice et al. | |
| 2005/0149740 A1 * | 7/2005 | Kotzin et al. | 713/185 |
| 2005/0149761 A1 | 7/2005 | Chiviendacz et al. | |
| 2005/0177522 A1 * | 8/2005 | Williams | 705/72 |
| 2005/0177716 A1 | 8/2005 | Ginter et al. | |
| 2005/0268096 A1 * | 12/2005 | Kilian-Kehr et al. | 713/168 |
| 2006/0156385 A1 | 7/2006 | Chiviendacz et al. | |
| 2006/0218393 A1 * | 9/2006 | Hernandez et al. | 713/167 |
| 2007/0005967 A1 | 1/2007 | Mister et al. | |
| 2007/0015490 A1 * | 1/2007 | Munje et al. | 455/410 |
| 2008/0109899 A1 * | 5/2008 | Rijnswou Van et al. | 726/21 |
| 2008/0301371 A1 * | 12/2008 | Peled et al. | 711/128 |

FOREIGN PATENT DOCUMENTS

| | | |
|---|---|---|
| FR | 2654238 | 5/1991 |
| WO | WO 99/24267 | 5/1999 |
| WO | 0208974 | 1/2002 |
| WO | 0217556 | 2/2002 |

OTHER PUBLICATIONS

America's Growth Capital; Authenticated Email Primer: Tumbleweed Jumps Into the Fray; Apr. 8, 2004; pp. 1-13.

The Dryad Numeral Cipherauthentication System; from https://hosta.atsc.eustis.army.mil; printed May 11, 2004; pp. 1-12.

PassMark; What are PassMarks?; from www.passmarksecurity.com; printed Apr. 21, 2005; p. 1.

Canadian Patent Office International Search Report for International Application No. PCT/CA2004/002091 dated Mar. 21, 2005.

Canadian Patent Office Written Opinion for International Application No. PCT/CA2004/002091 dated Mar. 21, 2005.

"RSA SecurID for Microsoft Windows", RSA Security, Inc. Brochure No. SIDMS DS 0504.

Canadian Patent Office International Search Report for International Application No. PCT/CA2005/00067 dated Jul. 18, 2005.

Canadian Patent Office International Search Report for International Application No. PCT/CA2006/001562 dated Dec. 15, 2006.

International Search Report from Canadian Patent Office; International Application No. PCT/CA2006/002017; dated Mar. 30, 2007.

International Search Report and Written Opinion from European Patent Office; International Application No. PCT/IB2004/002234; dated Jan. 24, 2005.

Tech FAQ "What is two Factor Authentication?"; pp. 1-2; Mar. 13, 2005 (Internet Archive Wayback Machine).

PFBlog "Why Do Credit Cards Expire?"; Feb. 7, 2005; p. 1; www.pfblog.com/archives/1560_why_do_credit_cards_expire.html.

Engineering Statistics Handbook, "Histogram"; Jun. 2004; pp. 1-3; http://www.itl.nist.gov/div898/handbook/eda/section3/histogra.html.

Microsoft, "Account Lockout Best Practices Whitepaper"; May 20, 2004; pp. 1-52.

SearchSecurity "TwoFactor Authentication"; Jun. 19, 2004; http://searchsecurity.techtarget.com/sDefinition/0,,sid14_gci992919,000.html.

Chinese Office Action; Chinese Application No. 200510121789.7; dated Sep. 25, 2009.

Australian Office Action; Australian Application No. 2004319571; dated Mar. 13, 2009.

Chinese Office Action; Chinese Application No. 200480043373.1; dated Mar. 27, 2009.

Australian Office Action; Australian Application No. 2005297350; dated Jun. 1, 2009.

Supplementary EP Search Report; EP Application No. 05706404.0; dated Nov. 5, 2007.

EP Office Action; EP Application No. 04802268.5; dated Dec. 30, 2010.

Chinese Office Action; Chinese Application No. 200510121789.7; dated Jun. 29, 2011.

English Translation of WO 91/06904; published May 16, 1991; corresponding to FR2654238 (Lefevre).

Supplementary EP Search Report; EP Application No. 04802268.5; dated Aug. 4, 2010.

\* cited by examiner

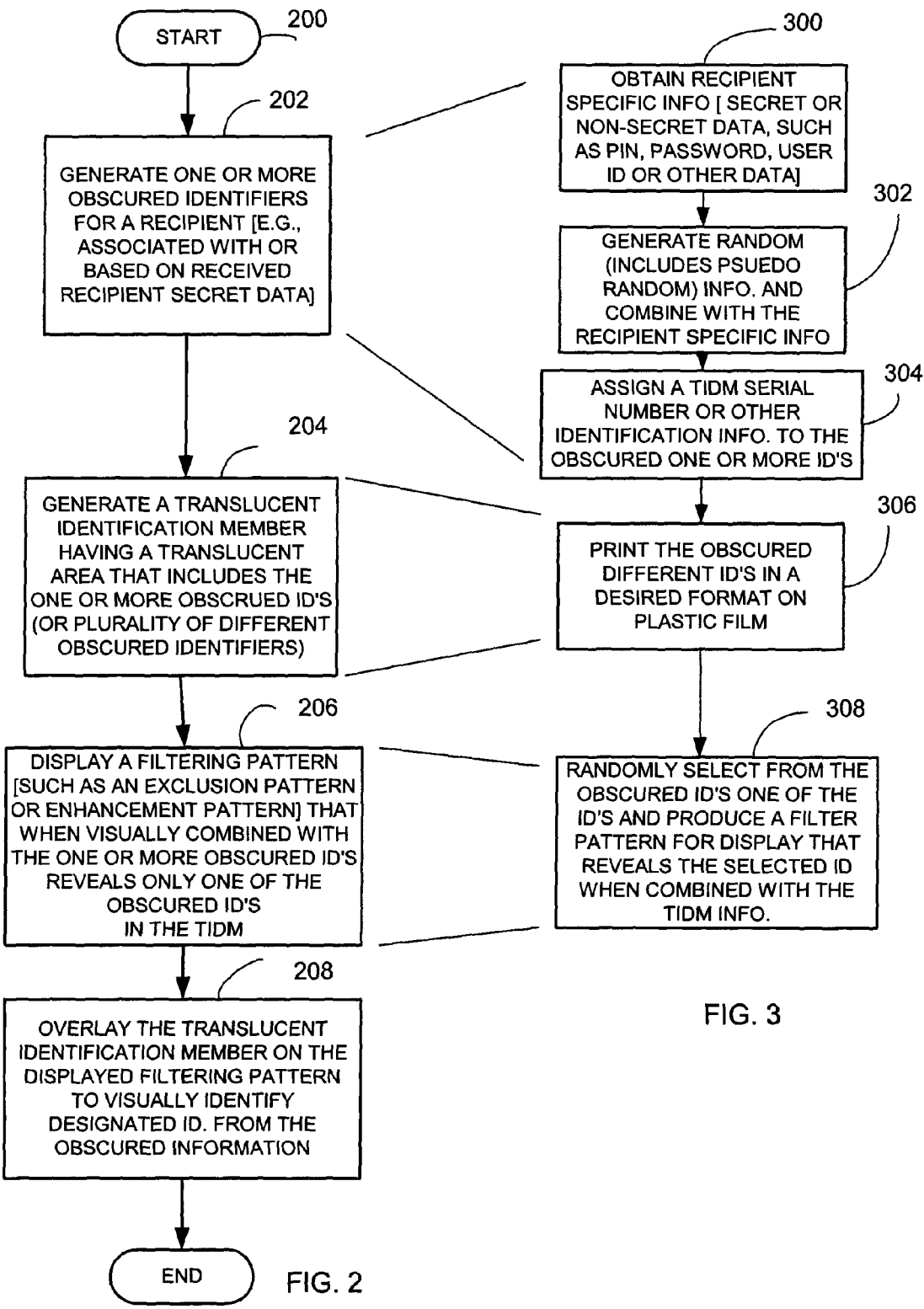

USER ID: [_____] ~500

PASSWORD: [_____] ~502

SERIAL NUMBER: [_____] ~44

( SUBMIT ) ( CANCEL )
        504

FIG. 5

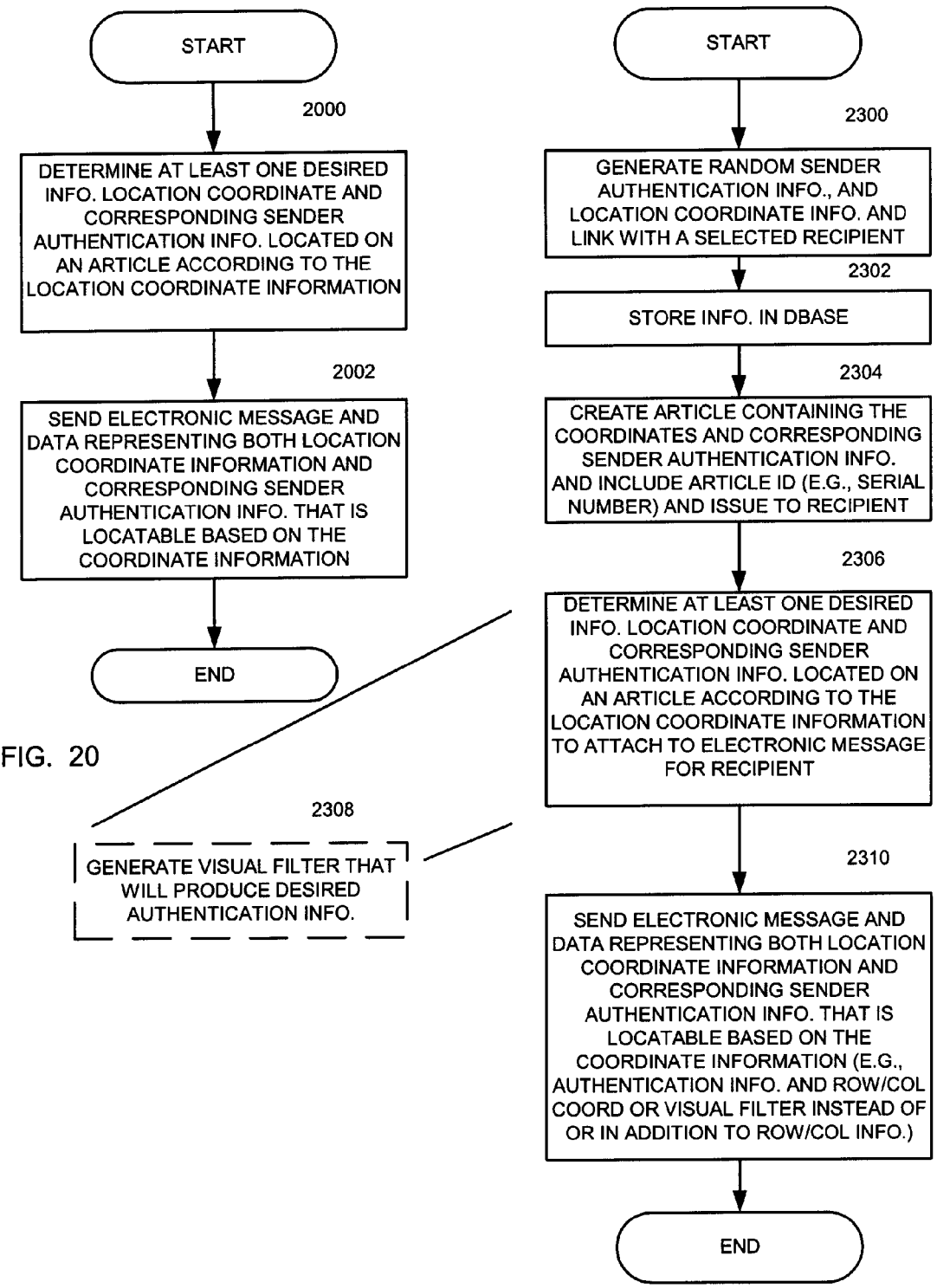

OFFLINE METHODS FOR AUTHENTICATION IN A CLIENT/SERVER AUTHENTICATION SYSTEM

RELATED APPLICATIONS

This is a continuation-in-part of U.S. patent application entitled METHOD AND APPARATUS FOR PROVIDING ELECTRONIC MESSAGE AUTHENTICATION, having Ser. No. 10/849,402, filed on May 19, 2004, having as inventors Voice et al. and owned by instant Assignee, which is a continuation in part of U.S. patent application entitled METHOD AND APPARATUS FOR SECURELY PROVIDING IDENTIFICATION INFORMATION USING TRANSLUCENT IDENTIFICATION MEMBER, having Ser. No. 10/748,523, filed on Dec. 30, 2003, having as inventors Chiviendacz et al. and owned by instant Assignee.

FIELD OF THE DISCLOSURE

The invention relates generally to method and apparatus for providing authentication between a user and a target resource or information sending entity, and more particularly to methods and apparatus that employ soft tokens or hard tokens for providing mutual authentication between a user and a target resource or information sending entity.

BACKGROUND

Mutual authentication systems and methods are known that attempt to authenticate a user or recipient of information that is being provided by a content service provider or other target resource that is, for example, accessible through an online communication link such as through the Internet, an intranet, or any other suitable wireless or non-wireless network. Such methods and apparatus attempt to thwart malicious exploits by hackers and others that attempt to steal a user's identity. For example, a malicious entity may send an email using the address of a legitimate bank and directs the recipient to a "counterfeit website". The recipient, believing that it is a legitimate site, may be tricked into providing information such as an account number and password that can be used by the malicious entity to access the recipient's online account. The problem may be particularly acute in the consumer world where conventional methods of online mutual authentication may be very complex, typically requiring expensive hardware deployment and complex user interactions that make such mutual authentication techniques impractical. As such, it would be desirable to provide a system and method that allows the confirmation of users or recipients that are accessing an intended target organization, (i.e. sending entity) in a relatively inexpensive but secure manner.

Two factor authentication techniques are known that, for example, use a first authentication factor to authenticate an end user's identity and a second factor that is used for authentication to supplement the user name and password typically used in the first factor authentication. The concept of a second factor is that a user can authenticate using something that they know (i.e. their password) and something that they have (i.e. the second factor which may be, for example, a hardware token). Typically the second factor mechanisms are hardware based and are physically distributed to the end user. For example, time synchronous tokens are known and are sometimes referred to as multi-factor authentication techniques. Several known techniques are described further below.

Also, various methods for performing authentication of a target organization in connection with Internet applications are known that include, for example, secure socket layer server authentication which provides certification from a trusted third party based on the identity of the organization hosting a given web application. However, this can require the user to perform the manual step of double clicking on an on-screen icon and reading through information. The requirement of manual action often precludes it from being performed consistently and, thus, undermines the effectiveness of the method. In addition, client security plug-in applications are also known that involve an end user downloading and installing client side software which provides a visual indication of when the user is communicating with the legitimate site. However, it can be burdensome for end users to download and install software or to go through several manual steps to confirm the identity of the target organization.

In addition, both user and target organization authentication methods can be impractical when extending to other channels of communication such as interactive voice response systems or communication through mobile devices, such as cellular phones, personal digital assistants, Internet appliances, or other mobile devices, as they can rely on a user display and entry methods unique to web based applications.

Ensuring that a sent email message or other electronic message has been sent by a sender that can be trusted, also referred to as being authentic, helps ensure against theft of important information by unscrupulous parties and can help limit spam and phishing. Phishing is a form of Internet scam that usually involves the mass sending of emails which appear to be from a legitimate organization such as a bank or other financial institution or other organization. These emails often direct the recipient to a fraudulent website or form where he or she is tricked into divulging personal or financial information. An alternative phishing scam may not ask for such information but, upon entering the URL, execute a download of a keystroke-logging program that lets the phisher harvest information from the recipient's machine. The information can then be used for identity theft and fraud.

Phishing attacks can be costly and can drain a company's resources since, for example a large number of attacks can be run against target companies in large volumes and billions of phishing messages pass through filtering systems that can slow down email delivery, use up valuable processing times of servers and can ultimately result in the loss of important financial data to unscrupulous parties.

Several solutions are known that attempt to address this problem. Because phishing attacks often begin with large volumes of email sent from a forged sending address, efforts to reduce spam email may be somewhat effective in reducing the number of phishing attacks. For example, one method referred to as Sender Policy Framework, an originator of a message or originator domain publishes in a directory or other suitable repository, legitimate sending computer addresses which are verified by receiving message transfer agents. The message transfer agent may verify a received message via a DNS server (domain name server). However, this technique can require widespread adoption of SPF-enabled message transfer agents which can potentially be costly to implement and deploy.

Another technique referred to as Coordinated Spam Reduction Initiative again requires originators in an originator domain to publish legitimate sending computer addresses which are verified by receiving message transfer agents in a relatively similar manner as described above.

Another technique requires domains to digitally sign email which is verified by the receiving message transfer agent via DNS servers. Again, this can require the widespread adoption of modified versions of message transfer agents.

Another technique uses the S/MIME protocol wherein sending individuals or domains digitally sign emails that are verified by receiving incoming message transfer agents or user email clients. This can require special email client features or recipient message transfer agents that are not currently supported in web based email clients.

Another technique employs secret images that are shared between a sender and a recipient. As understood, a personalized image is sent by a user to an authentication server. The server stores the recipient sent image. The authentication server may then send the personalized image to the recipient with an email and the user seeing the image recognizes that it is the one he sent. Also, during logon to a site, the server may include the image in the logon page so that a user trusts the login page when the user sees their personalized image. Among other drawbacks, this system appears to use the same image for multiple logins until the shared image is changed and may require the recipient to choose and send the image to a sending server.

In addition, other systems are known which attempt to provide, instead of sender authentication, recipient authentication. For example, U.S. Pat. No. 5,712,627 discloses, among other things, an issued identification card that has indicum at one of the addressable positions on an assigned card. The card may have rows and columns with different numbers, characters or symbols that are addressable by the rows and columns. To determine whether a person seeking access to data is authorized to obtain requested access, the identification card is distributed to authorized users. A requesting person seeking access provides the indicia at one or more addressable positions on the card as specified by a security system. To notify the person which indicum to enter and send back, the system selects coordinate indicia known to be present on a particular card. The recipient must then send back the indicia located at the address sent by the security system. If the indicia matches that assigned to the person seeking access then access is granted. However, such systems do not resolve the problem with respect to phishing since the system provides authentication of a receiver and not a sender and requests that a person seeking access identify themselves to the system and the system requires entry and sending by the user of information located on the security card.

Other authentication systems are also known that have been employed, for example, in the military, numeral cipher/ authentication systems have been used that employ cards that are held by a sender and recipient. A transmission is authenticated for example by using a challenge and reply authentication scheme. A sender of an electronic transmission for example may use the card and randomly select a row and column and transmit the row and column identifiers as a challenge. For a reply, row and column identifiers are used to look up an alphabetical letter which is then communicated back. As such, the sender can be assured that the receiver is in possession of a card. However, the authentication of the sender to the receiver is typically done by repeating the same challenge and reply in reverse, and both sender and receiver must be in possession of the same authentication card to achieve mutual authentication.

Another technique also uses a card that includes rows and columns of information on both the sender and receiver side, however, this transmission authentication scheme is used to authenticate transmissions. For example during transmission authentication, columns of transmission authentication diagraphs are located on the back of a cipher table and used to authenticate a sender. Column assignments are made by a designated representative such as a commander of a unit. The column assignments are known to both the sender and receiver apriori. Transmission authentication diagraphs are used only once. The first unused authenticator in the assigned column is used and a line is drawn through that authenticator to preclude its reuse. Such schemes do not utilize a random selection of information on the card and do not utilize the sending of coordinate information since the column information is known apriori. As such, only the authentication information is apparently communicated. If the sender sends authentication information and it is valid as determined by the recipient, the recipient crosses the authentication information off the card. The next time authentication is required, the next authentication information in the same column is then used. As such, a sequential and non-random approach is used. However, if the authentication card of a recipient is lost or obtained by an unscrupulous party, they would know how to act as a sender since they know which authentication information is next in the column since no random selection is utilized and since the card has markings thereon. In this system no coordinate information is sent since the column of information used to authenticate a sender is made known apriori to the sender and receiver. In addition, if the receiver does not receive the sender's transmission, the synchronization between the sender and receiver would be lost which may cause subsequent authentication attempts to fail.

Also, information security and user identification security are becoming increasingly important as technology becomes more sophisticated. For example, multi-factor authentication schemes are used in an attempt to thwart hackers or to thwart other inappropriate uses of information and user identities. For example, a two factor authentication scheme may use information known to a recipient or user such as a password or personal identification number (PIN) as well as some type of physical token such as a banking card, credit card, password token or other physical token which a user must be in physical possession of in order to initiate and complete an online transaction. Another level of authentication may include biometric authentication that may include the scanning of a fingerprint, eye or other biometric to again verify that the user attempting to gain access to a process, device, application or other right is in fact the appropriate user.

Transaction cards are known that may include for example smart cards, magnetic strip-based cards, and other transaction cards that facilitate banking transactions, credit card transactions, or any other suitable transactions. As known in the art, a user personal identification number (PIN) is usually required in addition to the possession of a banking card to obtain cash from a cash-dispensing machine or to otherwise carry out an online transaction. One known multi-factor authentication technique employs the use of a hardware token such as a battery operated smart card that displays a periodically changing and seemingly random number on a portion of the smart card. When a user wishes to execute a transaction with the smart card, for example, the user enters the seemingly random number that changes often. The receiving transaction server compares the received code entered by the user as displayed on the smart card with a corresponding number generated by a code source generator. If the code entered by the user matches the number generated by the code source generator, the transaction is approved and the user is granted a particular right such as accessing a bank account, purchasing goods, obtaining information, gaining access to a website or other software application, or any other suitable right as desired. However, such hardware tokens can be quite expensive and are battery powered thereby requiring changing of the battery and the potential of an electronic malfunction due to moisture problems or any other problems related to electronic circuitry.

Other smart cards that do not employ such screens typically require a card reader that reads, for example, a magnetic strip. This can be a restriction where a user wishes to perform an online transaction but is not sitting at a terminal that contains or has access to a magnetic strip reader.

In an apparently unrelated field, translucent cards are known such as plastic cards that contain a semi-transparent picture or pattern that when visually evaluated does not appear to connote any particular information. However, when the translucent card is held over a display with a corresponding background filter pattern, the combination of the pattern on the card with the background pattern on the display screen combine to present a visually recognizable message or word such as the word "sorry" or "you're a winner". These are static messages which are not unique to any user and typically include only a single message. Such plastic cards may be used for example to see if a holder has won a prize. The card for example may be mailed in the mail to members of a population. Those recipients then go to a web page identified on the translucent card or otherwise indicated in the mailing information to see if they have won a prize. However, such plastic cards do not provide multi-factor authentication, are not user specific, do not include multiple messages and typically include static messages.

In certain circumstances, it may be necessary to authenticate a user recipient when the user wants to use the resources of the recipient unit when the recipient unit is off-line relative to a target source. For example, the recipient unit may be a laptop computer that can login to a target source, such as a server, to use the resources of the server. A user may log into the server from a laptop computer by any one of the known authentication methods when the laptop is in online communication with the server. The authentication of the user, however, is typically provided by an on-line interaction between the recipient unit and the target source. When the recipient unit is off-line, i.e., not communicating with the target source, the system administrator may wish to also provide authentication of the user for accessing the resources of the recipient unit. Other than first level authentication, the administrator may wish to provide second level authentication of the user when accessing the off-line recipient. For example, the above noted laptop/server example, the user of the laptop may travel with the laptop and be unable to access the server through online authentication. However, the administrator may wish to limit the use of the laptop by the user when the user is off-line, or provide second level authentication of the user when using the resources of the laptop while off-line. However, without the recipient being online with the target source, a user typically cannot be second level authenticated, because the second level authentication information and verification of the user is typically transmitted from the target source to the recipient during on-line authentication.

An existing solution to the above-described problem is provided by RSA Security's RSA's SecurID® for Microsoft® Windows®, which is a client authentication client/server application that allows the use of a SecurID® time-synchronous one-time-password token for authentication to the Microsoft® Windows® client. SecurID® for Microsoft® Windows ® is capable of completing the authentication process offline. SecurID® includes an RSA Authentication Manager that resides on the server, and an RSA Agent for Microsoft® Windows® that resides on the client.

The first step in SecureID's process is that after a successful online authentication, the Authentication Manager prepares the client system for offline authentication by pre-calculating a series of future time dependent authentication codes to be used by the client for a determined number of days. The Authentication Manager then hashes the codes and sends them for secure storage on the client system. When the user attempts to logon to their desktop offline, the Authentication Agent for Microsoft® Windows® will recognize that the client isn't connected to the server will prompt the user for their userID and passcode. The Authentication Agent then compares the information entered by the user with the stored codes and will grant or deny access accordingly. The next time that the user logs onto the desktop with online connection to the server, the Authentication Manager will update the codes stored on the client for future offline access.

The SecurID® product, however, has several drawbacks. One drawback is that the entire offline authentication provided by SecurID® is time-dependant. SecurID® requires the system clocks of the offline client and that of the authentication server to be synchronized or else the authentication attempts will fail because the submitted codes will be verified against the system clock. Another drawback is that the offline authentication mechanism isn't flexible enough to accommodate a user who can be offline for an indeterminate period of time. Should the offline period be longer than the predetermined time period allowed for offline authentication, then the system can no longer authenticate the user. Once the time period expires, user trust and authentication is no longer controlled by the authentication mechanism. Yet another drawback is that pre-calculated time dependent authentication replies (i.e., codes) are stored on the client that have no corresponding challenges. Therefore, the challenge never changes and applies to all of the pre-calculated replies.

Accordingly, a need exists for a method and apparatus that overcomes one or more of the above problems.

BRIEF DESCRIPTION OF THE DRAWINGS

FIG. 2 is flow chart illustrating one example of a method for securely providing identification information in accordance with one embodiment of the invention;

FIG. 3 is a diagram illustrating a further break down of the method shown in FIG. 2;

FIG. 5 is a diagram graphically illustrating one example of a login screen to facilitate authentication of a user or for securely providing identification information in accordance with one embodiment of the invention;

FIG. 20 is a flow chart illustrating one example of a method for providing electronic message authentication in accordance with one embodiment of the invention;

FIG. 23 is a flowchart illustrating one example of a method for providing electronic message authentication in accordance with one embodiment of the invention.

DETAILED DESCRIPTION

Figure 1:
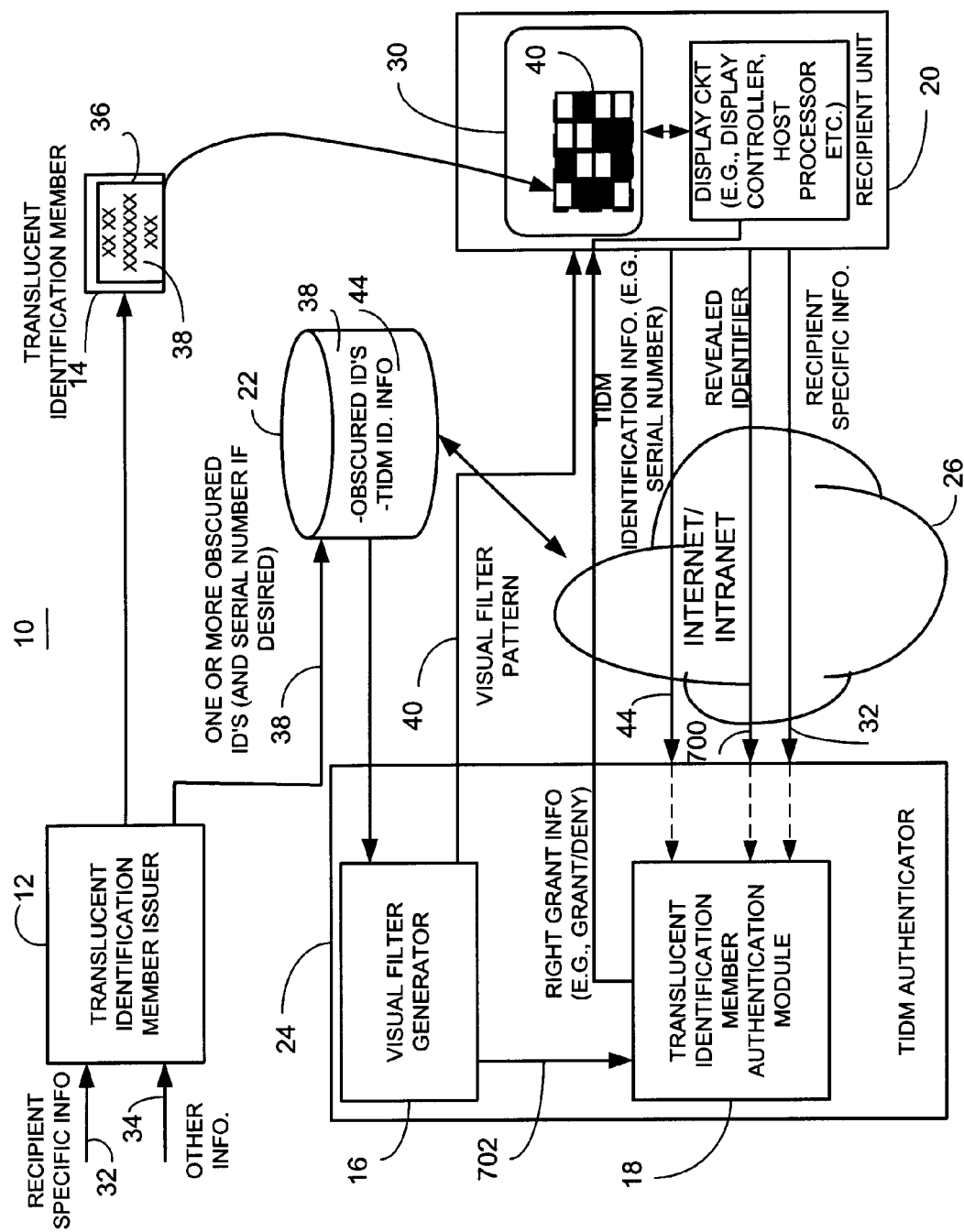
FIG. 1 is a block diagram illustrating one example of a system for securely providing identification information in accordance with one embodiment of the invention.

Briefly, a method for providing authentication of a user of a recipient unit is disclosed when the recipient unit is off-line. The method includes storing at least one challenge-reply set associated with an article based on an on-line communication with a sender unit. The challenge-reply set includes at least a challenge-reply pair for use in off-line authentication of the user for a particular resource available through the recipient unit. When the user is offline, the method includes selecting the stored challenge-reply set for off-line authentication of the user for the particular resource available through the recipient unit. The method also includes storing a plurality of challenge-reply sets associated with an article with each challenge-reply set including at least a challenge-reply pair for use in off-line authentication of the user. Accordingly, when the user is offline, the method includes selecting at least one of the plurality of challenge-reply sets for off-line authentication of the user for the particular resource available through the recipient unit.

In another embodiment, a method for providing mutual authentication between a user and a sending unit, (i.e. target resource) in one embodiment, includes determining, for a user that has been assigned an article, such as a card or other suitable article that has indicia thereon, desired sender authentication information that corresponds to actual sender authentication information that is embodied on the article. The sender authentication information can be located on the article by using the location information provided by the sending unit in a challenge. The method includes determining for the user, corresponding article identification information, such as a serial number that has been assigned to the article, or a shared secret, and sending a challenge for the user wherein the challenge includes at least location information, to allow the user to identify desired sender authentication information located on the article, and sending the article identification information. The user then receives the location information and article identification information and uses the article identification information as authenticating information that indicates that the sender has sent the information is trustworthy since the article that is in the possession of the user also includes the article identification information thereon. The user then uses the location information that has been sent to the user device, to determine for example the corresponding desired sender authentication information that is located on the article, such as by column and row information sent by the target resource and sends a reply to the challenge back to the target resource (i.e. sending unit). The sender then authenticates the user based on the reply to the challenge. The reply includes user authentication information obtained from the article namely the desired sender authentication information. If the received sender authentication information sent by the user device (and obtained from the article), based on the location information, matches the desired sender authentication information, the target resource grants suitable access to the user (i.e. the user device). As such, article identification information is sent along with location information by a sender after, for example, a first level of authentication has been determined to be successful. The first level of authentication may include, for example, the user sending a password and user ID to the target resource in an initial stage of a logon procedure, as known in the art, whereafter the sending of the location information and article identifier information is subsequently sent based on a successful first factor authentication process.

In another example, a method for providing mutual authentication does not require the sending of the article identification information to the user, but instead only requires the sending of the location information to allow the user to identify the corresponding authentication information on the article and send a reply back to the target resource for verification. However, in this embodiment, if the reply does not include the expected target resource authentication information as expected by the sending unit, the method includes repeating the same challenge for the user that includes the same location information that was previously sent. This process is repeated over, for example, each successive session, until the user sends the appropriate target source authentication information that was derived from the article based on the location information sent in the challenge.

In addition, suitable devices are also disclosed that carry out the above methods. Also, a combination of the two methods is employed to effect a type of enhanced mutual authentication process.

Also disclosed is a method for providing electronic message authentication that employs an article (also referred to as a member or token), such as a card, sticker, or any other suitable article, that includes sender authentication information and location information, such as row and column headings. In one example, each recipient of interest is issued an article that embodies sender authentication information that is identifiable by corresponding location information such as column and row identifiers. When the sender of an electronic message wants to send a message to a recipient of interest, the sender sends the electronic message and both location information and corresponding desired sender authentication information located at the location identified by the location information. This includes data representing the location and authentication information (such as an index to, a reference to, the location information or authentication information itself, or any suitable representation thereof). The recipient may then, in one embodiment, look on their article (e.g. card) at the corresponding location and see if the sent desired sender authentication information matches the sender authentication information located on the article (also referred to as expected sender authentication information). If a match occurs, then the recipient trusts the sender of the message. The recipient need not send back any information to the sender. As such, a simple card or other article may be used to authenticate a sender of a message to thwart phishing, or other sender authentication problems. Other examples will be recognized by those of ordinary skill in the art.

In addition, a system for providing electronic message authentication is also disclosed that carries out the above methodology, and a transaction card is also disclosed that includes the location information and sender authentication information thereon in the form of a sticker or as part of the transaction card itself. In yet another embodiment, the article may be a translucent article to allow light to pass therethrough so that a visual filtering pattern and sender authentication information may be sent by a sender along with the message. A user may hold up the article to a display screen and overlay it on the visual filtering pattern sent by the sender. If the resulting sender authentication information matches the results sent in the message, the recipient may trust the sender of the message.

In another embodiment, an apparatus and method for securely providing identification information generates one or more obscured user (e.g., recipient) identifiers for a recipient, such as a plurality of identifiers that are generated based on user secret data such as a password, personal identification number or other secret or non-secret information or identifiers that are not based on user secret data, such as the identifier being randomly generated and then associated with the user. In this case, no user-related information is used, but the identifier can still identify the user. In another embodiment, a single obscured identifier may be used.

In one embodiment, the method and apparatus generates a translucent identification member (TIDM), such as a portion of, or an entire, plastic card, sheet, film, or other suitable member that has a translucent area that includes the one or more obscured identifiers. As used herein, translucent area can also include a transparent area. For example, the translucent identification member may be made from transparent or clear sheets, including smoked plastic or other suitable coloring with the obscured identifiers (including non-character information) printed in ink or otherwise placed thereon or therein. The one or more obscured identifiers may be for example one-time authentication identifiers that are unique to a recipient of the translucent identification member. As such, the translucent identification member or card contains what appears to visually be a random pattern of information.

A corresponding visual filtering pattern is also generated for display on a display device when the user desires to use the translucent identification member. For example, the visual filtering pattern also appears to be random from a visual point of view but when visually combined with the one or more obscured identifiers on the translucent identification member, a designated one of the one or more obscured identifiers is visually revealed. In one embodiment, a user may overlay the translucent identification member over a designated portion of a display device or in the designated portion of a display that displays the visual filtering pattern. A combination of the visual filtering pattern with the pattern of different obscured identifiers on the translucent identification member combine to form a visually revealed single identifier or message from the one or more identifiers. Hence, for example in one embodiment, a seemingly random pattern is generated on a screen which helps ensure only a single identifier is exposed visually to a user that is viewing the translucent identification member which is overlayed on the visual filtering pattern that is being displayed on the display.

Accordingly, if desired, a security officer that has access, for example, to a translucent identification member issuer may use a package of blank cellophane cards that may be used to make the translucent identification members on a local printer. The translucent identification members may be printed having translucent color pattern that serves as the one or more obscured identifiers, or have other suitable indicia that appears to be semi-random or obscured to a user. Use of color or color background may also be used to defeat photocopying attacks. It will be recognized that portions of or all functions of the translucent identification member issuer may be provided through a distribution of providers and networks or through a web based service. For example, a recipient may access a TIDM issuance service through a web connection and locally print the TIDM or receive the TIDM through the mail. Also, identifiers can be provided by one party and sent to another party for printing or manufacturing. Other distribution of operations may also be employed as desired.

Once a visually revealed identifier is presented to a user, a user enters the visually revealed identifier through a user interface where it is compared to an expected identifier. If the entered identifier matches the expected identifier, proper authentication is indicated and a recipient may be granted access to a device, application, or process or other desired right (or submitted data is accepted—e.g. such as a vote). In addition, a list of revoked translucent identification members may also be maintained to prevent compromise due to theft or loss of translucent identification members. The list may be stored in any suitable location and updated by a service provider, translucent identification member issuer or any suitable entity. Since the translucent identification members do not require electronics to generate random numbers, the cost of such translucent identification members may be quite low and their reliability may also be relatively high since they are not susceptible to moisture or other damage typically associated with smart cards.

In an alternative embodiment, a smart card or other transaction card or non-transaction card (e.g., voting card or other suitable card) may include a translucent identification member if desired. Hence a transaction card is disclosed and includes for example a portion containing card identification information (such as a transaction card number, which may be impressed thereon such as through raised printing or electronically or through any other suitable storage mechanism such as magnetic strip or any other suitable mechanism), as well as a portion containing a translucent identification member that has a translucent area that includes one or more obscured identifiers. As such transaction cards such as credit cards, banking cards or any other transaction cards may include a window that contains the translucent identification member or may have a transaction identification number or other identification information affixed to a conventional transaction card to enhance security.

In another embodiment, the role of the translucent identification member and the recipient unit are reversed. For example, in this embodiment, the translucent identification member contains the visual filtering pattern and the display screen displays at least one obscured identifier that may be for example data representing user authentication data that is unique to a user, or other data if desired. The combination of overlaying the translucent identification member (visual filter) over the display that displays an obscured identifier, reveals (un-obscures) the at least one obscured identifier on the screen. The visual filtering pattern on the member stays the same since it is printed on the member, and the displayed obscured identifier is changed during each session or at other suitable intervals.

Accordingly, one or more of the following advantages may result. Since the translucent identification members can be printed by an organization security officer, no manufacturing costs need to be incurred and they can be generated locally for a recipient. Since there need not be electronics, there is no battery to be replaced and no damage from exposure to moisture need occur. No network or radio connectivity is required such as typically required by devices employing magnetic strips. The translucent identification member may be made of plastic or any other suitable material and in any suitable thickness. They are durable and easy to replace in the event of a compromise since they may be produced locally to an organization. Also investment in a substantial network infrastructure to continually generate master codes that are matched with dynamically changing codes on a screen and a smart card can be avoided.

In one embodiment, the displayed visual filtering pattern selectively illuminates a portion of a translucent identification member to visually reveal one of the one or more obscured identifiers. The visual filtering pattern can be changed with each authentication session. The one or more obscured identifiers are printed indicia on a semitransparent (or transparent) card and is preferably unique within a particular domain of users. The one or more obscured identifiers are visually obscured through many suitable techniques such as color shading, ordering of the characters, a combination thereof or any other suitable visual obfuscation technique. FIG. 1 illustrates one example of a system 10 for securely providing identification information that includes a translucent identification member issuer 12 operative to generate a secure identification member such as translucent identification member 14, a visual filter generator 16, a translucent identification member authentication module 18, a recipient unit 20 and memory 22. In this example, the visual filter generator 16 and translucent identification member authentication module 18 are included as part of a translucent identification member authenticator 24 that may be implemented as one or more software modules executing on a computing unit such as a personal computer, work station, server, hand held device, or any other suitable device or multiple networked devices. The translucent identification member authenticator 24 is operatively coupled, in this example, to a web server which in turn is operatively coupled to a network such as the Internet 26 to facilitate web based communication between a recipient unit 20 and a translucent identification member authenticator 24. As such multiple circuits are formed by the software and processing device(s). Also, as used herein, circuits also refers to any suitable electronic logic in any suitable form including but not limited to hardware (microprocessors, discrete logic, state machines, digital signal processor etc.), software, firmware or any suitable combination thereof.

The translucent identification member issuer 12, the visual filter generator 16, and the translucent identification member authentication module 18 may be implemented in any suitable manner and is preferably, but not limited to, software modules executing on one or more computing devices that contain one or more processing devices that execute instructions that are stored in memory.

In this example, the translucent identification member issuer 12 will be described as a local server that generates the translucent identification member 14 using a printer or other suitable mechanism to generate a translucent identification member 14. The translucent identification member includes a translucent area that includes one or more obscured identifiers thereon. However, it will be recognized that the translucent identification member issuer 12 may be included as part of the translucent identification member authenticator 24, or may be located on any other suitable device including a web server and it will be recognized that any of the software programs described herein may be suitably located on any suitable device or devices as well.

The memory 22 may be any suitable local or distributed memory and may be located on a web server or locally if desired. The memory may be RAM, ROM or any suitable memory technology. The recipient unit 20 may be any suitable device such as a laptop computer, desktop computer, hand held device or any other suitable device that includes a display 30 and user interface, and may include one or more processing devices that execute instructions stored in any suitable memory. The recipient device includes the requisite circuitry to provide one or more user interfaces such as graphic user interfaces through web browsers or other applications or operating systems and may include speech recognition interfaces or any suitable user input interfaces. As such the units include a display circuit operative to display a visual filtering pattern defined such that when the visual filtering pattern is visually combined with one or more obscured identifiers located on a translucent identification member, a designated one of the one or more identifiers is visually revealed; and an input interface operative to receive data representing the visually revealed identifier. In one example, a user interface is used to request entry of a serial number associated with the translucent identification member; and request entry of the revealed identifier to determine whether to grant a desired right for the recipient.

Also if desired, a receiver unit can receive the filter or obscured identifiers for display on a display screen and send the response back through a completely different device (or through a completely different channel) such as a cell phone, by SMS message, email message or other suitable channel and/or device.

Referring also to FIGS. 2 and 3, a method for securely providing identification information will be described. As shown in block 200, a recipient sends a request into the translucent identification member issuer 12 through the Internet or through any other suitable mechanism to request issuance of a translucent identification member 14. This may be done for example by a recipient registering with an online financial institution with user-supplied data such as a password or other secret information. This is shown as recipient specific information 32 that is received by the translucent identification member issuer 12.

As shown in block 202, the method includes generating one or more obscured identifiers for a recipient, which may be based on, for example, the recipient specific information 32 and/or other information 34. The other information 34 may be a translucent identification member serial number or other suitable information if desired. This may be done for example by the translucent identification member issuer 12, or any other suitable entity. As shown in block 204, the method includes generating the translucent identification member 14 that has a translucent area 36 that includes one or more obscured identifiers 38. The one or more obscured identifiers 38 are generated by the translucent identification member issuer 12 in this example and stored in memory 22 in a database form. The one or more obscured identifiers are stored in memory 22 so that they may be subsequently accessed when it becomes necessary to create appropriate visual patterns 40 to reveal the desired revealed identifier 700 or when checking the returned revealed identifier 700.

Figure 4:
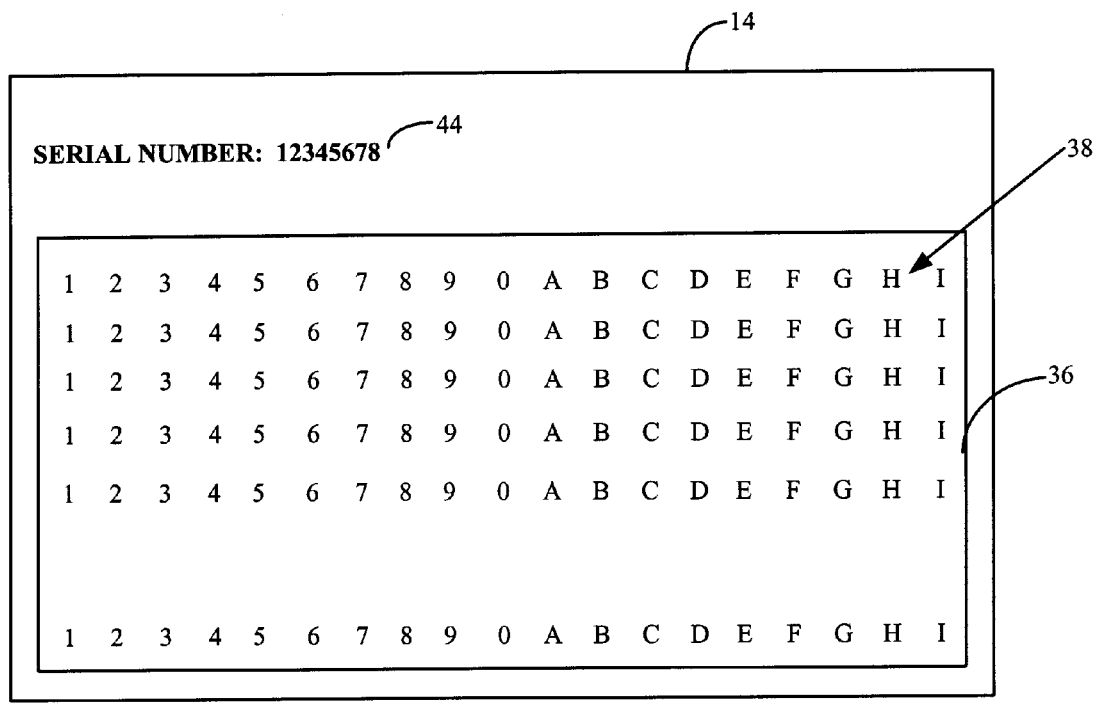
FIG. 4 is a diagram illustrating one example of a secure identification information member in accordance with one embodiment of the invention.

For example, the translucent identification member issuer 12 may control a printer to print a cellophane card as a translucent identification member 14 that has printed thereon one or more obscured identifiers. One example of a translucent identification member is shown in FIG. 4. The translucent identification member 14 can be made of any suitable material such as plastic or any other suitable material that provides some level of transparency so that a combination of the one or more obscured identifiers when overlayed on a display that emits light, allows the light energy (or lack of light energy) from the display to combine with the one or more identifiers to visually designate one of the one or more identifiers on a translucent identification member.

The one or more identifiers on a translucent identification member may also be a plurality of different obscured identifiers.

The translucent identification member 14 may be a card, sheet, film or other member that may include if desired any suitable adhesive or connecting structure to be applied over a window of a transaction card, or any other suitable material. The translucent identification member may also be connected to a transaction card, such as, for example, by using a suitable connecting structure to join the translucent identification member to an end or side of a transaction card. The one or more obscured identifiers 38 that are printed on the translucent identification member 38, as noted above, may be characters (e.g., ASCII), symbols, print patterns, colored versions thereof or any other suitable indicia. The one or more obscured identifiers 38 appear to be visually obscured and hence seemingly random when viewed by a recipient. In other embodiments it may be desirable to print patterns of ink that do not connote characters but instead visually conceal a message or other information so that when overlayed on top of a display the pattern generated by the display in combination with the printed image, allows the viewer to visually decipher a revealed identifier.

The translucent area 36 includes an information pattern that represents one or more identifiers that may be unique identification information that may be used for one or more authentication sessions or other purposes. The information pattern represented by one or more obscured identifiers is preferably unique to a given domain of users to reduce the likelihood of the same user obtaining a same translucent identification member with the same obscured identifiers. The translucent area 36 is configured (e.g. sized) to overlay at least a portion of the display screen 30 on the recipient unit 20. In one embodiment, each of the one or more obscured identifiers may serve as one-time authentication identifiers for the recipient of the translucent identification member. It is noted, as used herein, identification information includes any information used to directly or indirectly authenticate a user (e.g., TIDM recipient) or other process of interest, or to get access to a desired right associated with a process or device, or any other suitable information that is intended to be kept secret except at the time a transaction is to be effected.

To make the TIDM, the method may include receiving a request from a user for one or more obscured user identifiers and recording a link between the user and the identification information associated with the one or more obscured user identifiers. The method may include providing the one or more obscured user identifiers to the user wherein the one or more obscured user identifiers are on a translucent identification member that is sent to the user, the one or more obscured user identifiers are sent to a third party to be placed on a translucent identification member for the user, the one or more obscured user identifiers are sent to the user for placement on a translucent identification member, and the one or more obscured user identifiers are selected from a pre-existing pool of obscured user identifiers. The request from the user may include user specific information and the user specific information may be used to create the one or more obscured identifiers or may be combined with other information to produce the one or more obscured user identifiers.

As shown in block 206, once the translucent identification member 14 has been generated and provided to a recipient, the visual filtering generator 16, or other suitable mechanism generates a visual filtering pattern for display on the display 30 of the recipient device. When the visual filtering pattern 40 is displayed by the recipient device, the visual filtering pattern visually combines with the one or more obscured identifiers located on the translucent identification member 14, to designate one of the one or more identifiers. In other words, the visual filtering pattern filters out undesired identifiers to reveal a selected one of the one or more identifiers.

As shown in block 208, the method may include overlaying, such as by a recipient, or a device, the translucent identification member 14 on the displayed filtering pattern 40 to visually identify a designated one of the obscured identifiers on the translucent identification member 14. The visually identified identifier is then entered by the recipient to facilitate a transaction or gain access to a specific desired right associated with any process or device of interest.

As shown again in FIG. 3, the steps of FIG. 2 are presented in more detail. As shown in block 300, generating one or more obscured identifiers for a recipient may be done for example by the translucent identification member issuer 12 or any other suitable entity by obtaining recipient specific information, such as secret or non-secret data or non-user related information. This process may also be accomplished by using non user-related and non user-supplied material, in which case, the generated one or more obscured identifiers are subsequently associated with a user. When recipient specific information is used, this may be a personal identification number, password, user name, account number or other data provided by the recipient through the recipient unit 20 or from any other suitable source. This is indicated as recipient specific information 32. As shown in block 302 the recipient specific information 32 is suitably combined, such as through a suitable mathematical function or algorithm, to produce the one or more obscured identifiers 38. The other information 34 may be, for example, output generated from a random number generator, the actual translucent identification member serial number 44 (or other TIDM identification information) that may be printed on the translucent identification member 14 or stored by the translucent identification member issuer 12, or any other suitable information. As shown in block 204, a translucent identification member serial number, or any other suitable information for identifying the translucent identification member, is assigned to the obscured one or more identifiers 38. It will be recognized that upon an initial request or generation of a translucent identification member that the translucent identification member issuer 12 may select a translucent identification member serial number and associate therewith the recipient specific information 32. This information may be combined to generate the one or more obscured identifiers 38. The translucent identification member serial number 44 may be stored in memory 22 for later use by the translucent identification member authenticator 24 (authenticating a recipient using the translucent identification member 14). The order of the steps as described herein with respect to any method may be suitably reordered based on a desired result.

As shown in block 306, generating the translucent identification member 14 may include printing the obscured different identifiers in a desired format on a plastic film, sheet or card to produce the translucent identification member 14. As shown in block 308, displaying the filtering pattern 40 on a display may include randomly selecting, from the obscured identifiers, a selected identifier to produce a visual filtering pattern 40 on display 30 that reveals the selected one of the obscured identifiers as the identifier to be revealed when the translucent identification member 14 is overlayed on the visual filtering pattern 40.

As shown in FIGS. 4 through 7, and to further illustrate an example, as shown in FIG. 4, the translucent identification member 14 has printed thereon the translucent identification member serial number 44 or other identification information and the one or more obscured identifiers 38 printed in the translucent area 36. As noted above this may be printed on cellophane material or other material readily accommodated by conventional printers, if desired, to reduce fabrication costs. However any suitable material or manufacturing process may be used. Once the recipient is in possession of the translucent identification member 14, multi-factor authentication is provided using the translucent identification member 14.

The filter may be generated in any suitable way. For example, a selected obscured identifier may be chosen from the stored one or more obscured identifiers whose position on the TIDM is defined. The visual filter pattern generator 16 produces a filtering pattern based on a predefined layout of the TIDM to insure that the filter blocks the proper character locations. Any other suitable technique may also be used.

As shown in FIG. 5, the recipient device 20 may display, through a web browser or other suitable user interface, an input screen, based on a received HTML page if a web browser is being used, containing fields that receive user input such as a user identifier field 500, a password field 502 and the translucent identification member serial number field 44. The user submits the entered information through suitable interface buttons 504. This information is then sent to the web server via the Internet and if desired forwarded to the translucent identification member authenticator 24. As shown in this example the information entered in user ID field 500 or the password field 502 may be considered recipient specific information 32 that was previously entered when the translucent identification member issuer 12 initially generated the translucent identification member 14.

Figure 6:
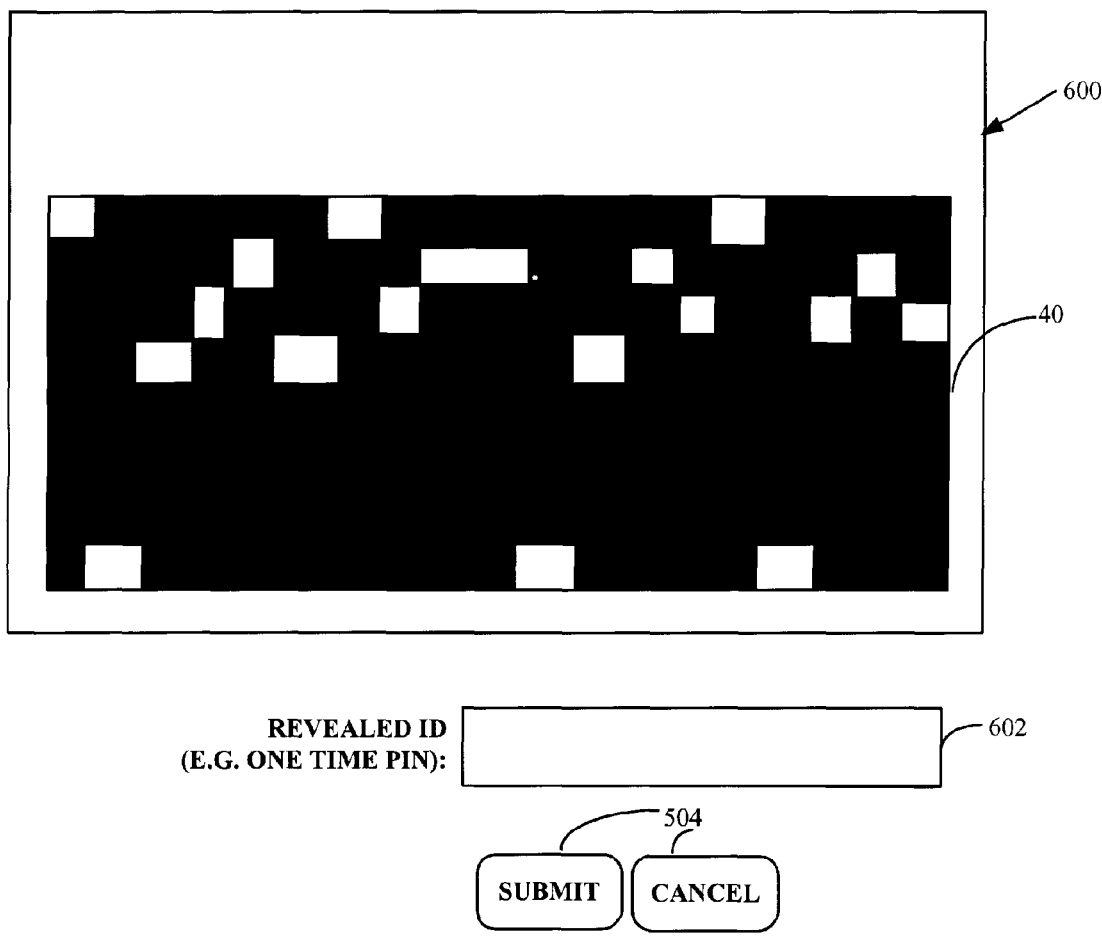
FIG. 6 diagrammatically illustrates one example of a displayed visual filtering pattern in accordance with one embodiment of the invention.

FIG. 6 illustrates one example of a graphic user interface (generated based on a received HTML page) displayed on display 30 to facilitate securely providing identification information using the translucent identification member 14. The graphic user interface may be generated for example through a web browser and suitable host processor on the recipient unit or any other suitable processor, and indicates an overlay area 600 that may be the same size or a different size than a visual filtering pattern 40 that is presented on the display 30. Hence in response to the login screen shown in FIG. 5, the translucent identification member authenticator 24 submits a response containing the visual filtering pattern 40 and the response interface screen shown in FIG. 6. The recipient unit 20 displays the visual filtering pattern 40 and a revealed identifier field 602 to allow entry of the one revealed ID from the one or more obscured identifiers.

Figure 7:
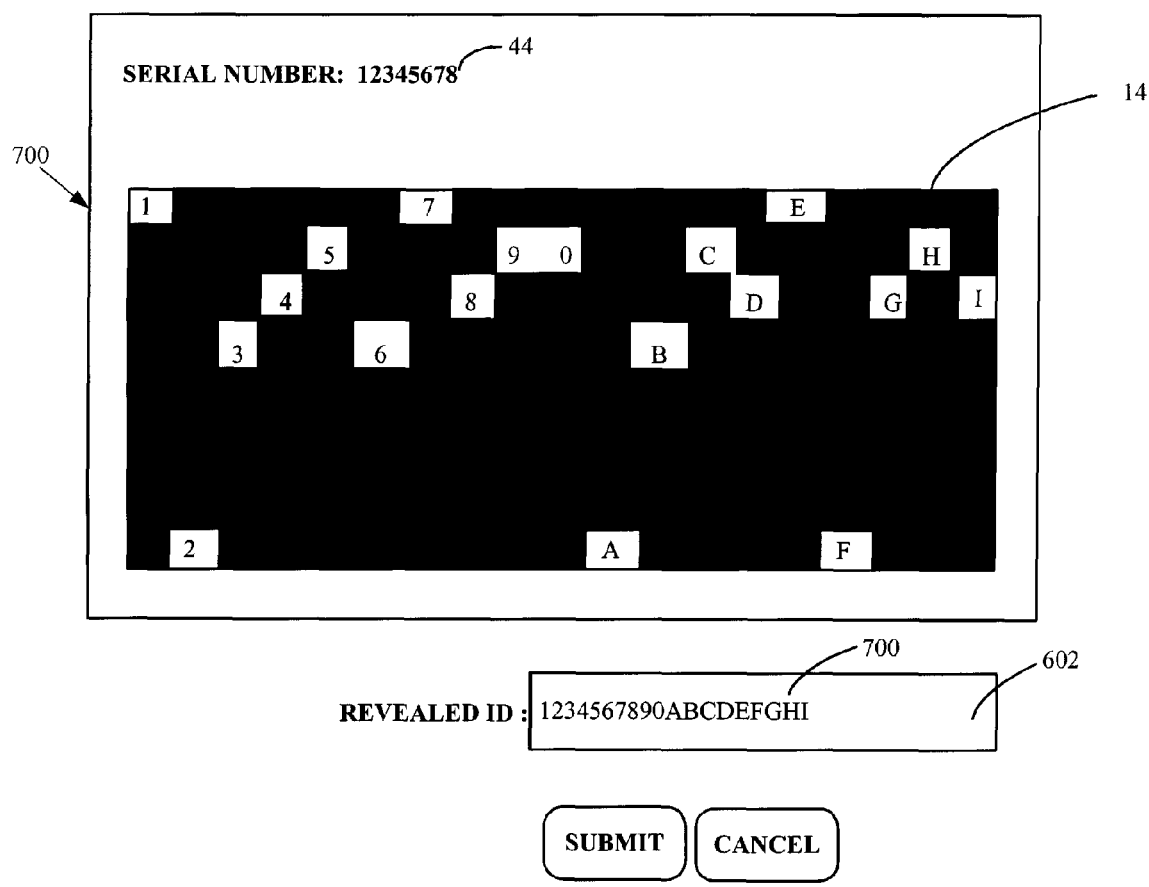
FIG. 7 graphically illustrates one example of a visually identified designated identifier from one or more obscured identifiers that are located on a translucent identification member in accordance with one embodiment of the invention.

FIG. 7 graphically illustrates the condition where the translucent identification member 14 is overlayed on top of the visual filtering pattern 40 to reveal one of the one or more obscured identifiers. The user positions the translucent identification member 14 and hence the one or more printed obscured identifiers 38 over the visual filtering pattern 40 and the combination of the visual filtering pattern 40 and the printed different obscured identifiers 38 reveals in this example a revealed identifier 700 which is then entered by the recipient in the revealed identifier field 602. The user then submits the revealed identifier 700 to the translucent identification member authenticator 24 to authenticate the user for the particular transaction or for access to a particular right. Accordingly, the translucent identification member authenticator 24 receives data representing the revealed identifier 700 in response to a user or other entity overlaying the translucent identification member 14 on the display 30. The translucent identification member authentication module 18 compares the received revealed identifier 700 with a corresponding expected identifier 702 (see FIG. 1) to determine whether proper authentication of the recipient is appropriate. The translucent identification member authentication module 18 obtains the corresponding expected identifier 702 from the memory 22 or may generate the expected identifier on the fly knowing the visual filter pattern and accessing the obscured identifiers 38, or may obtain the expected identifier 702 in any other suitable manner.

Figure 8:
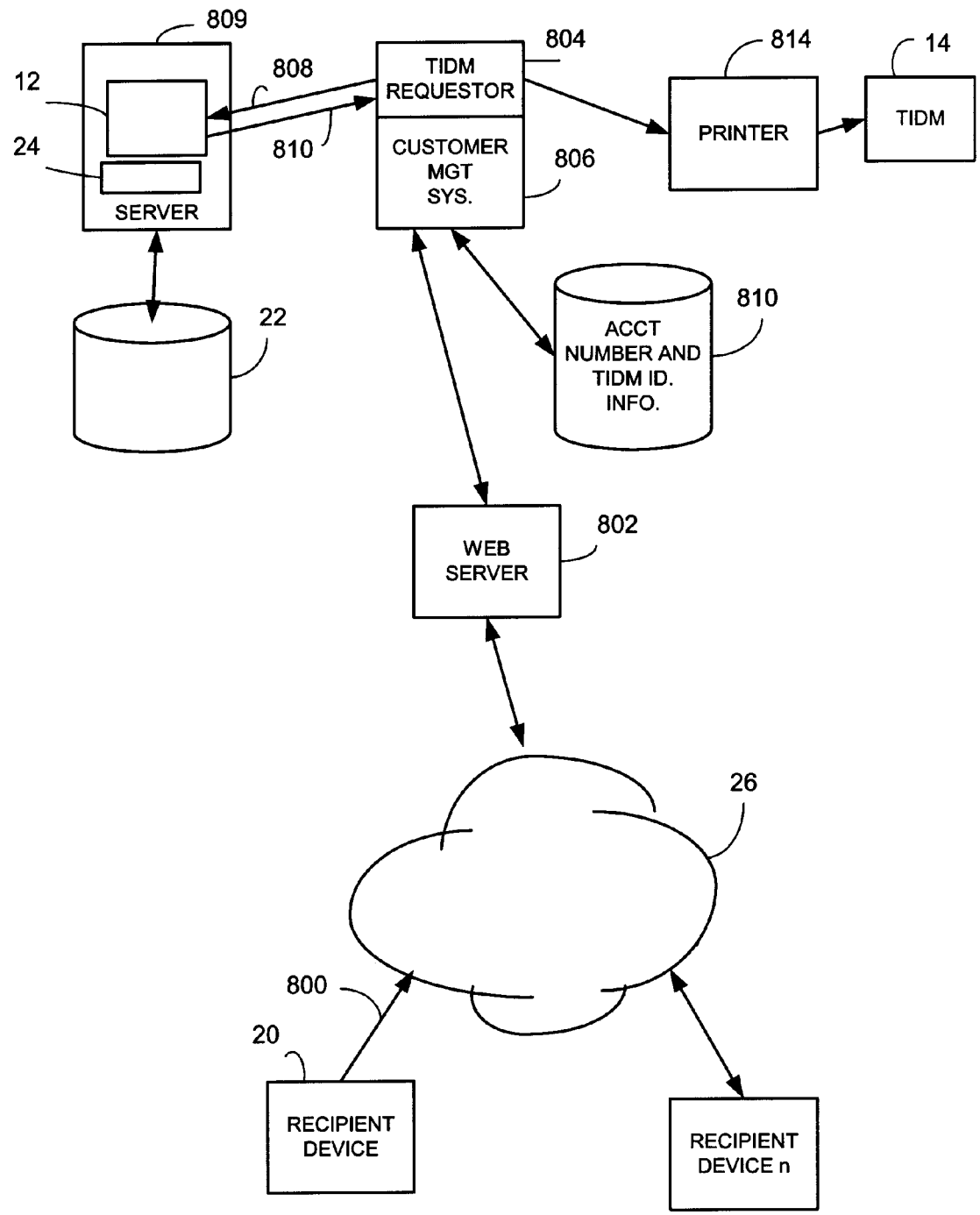
FIG. 8 is a diagram of a system for securely providing identification information in accordance with one embodiment of the invention.
Figure 9:
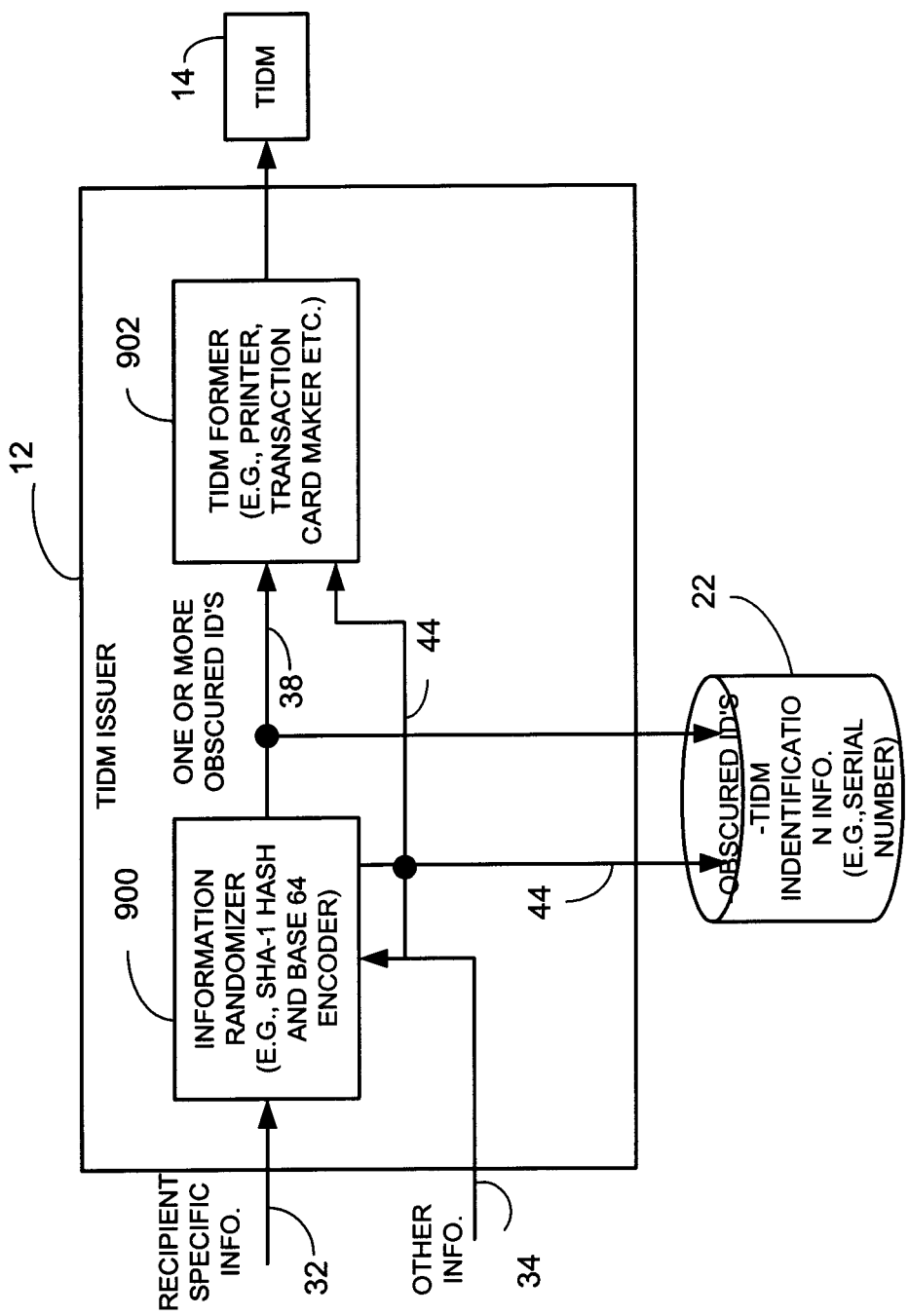
FIG. 9 is a block diagram illustrating in more detail one example of a translucent identification member issuer in accordance with one embodiment of the invention.

Referring to FIGS. 8 and 9 the issuance of a translucent identification member 14 will be described in more detail by way of an exemplary embodiment. In order to obtain a translucent identification member 14, a recipient registers with an online bank or other institution using recipient specific information 32 such as an account number or other information as indicated by registration request 800. This request is then passed through to a web server 802. The web server 802 then communicates with a bank server 804 which includes for example a customer management system and translucent identification member requester 806 which may be a suitable software application executing on a processing device if desired or any other suitable structure. The bank server 804 then generates a translucent identification member issuance request 808 to the translucent identification member issuer 12 which may be included in or separate from a suitable server 810. The translucent identification member issuance request 808 includes the recipient specific information 32 entered by the user. In response, the translucent identification member issuer 12 provides the obscured identifiers 38 in a response message 810 and generates and records a translucent identification member serial number 44 in the memory 22 along with the associated obscured identifiers 38 that will appear on the translucent ID member 14 for the requesting recipient. In this example, the bank server 804 links the recipient's account with the translucent identification member serial number 44 and then stores the linked information in a database 810 for later use. The bank server 804 then generates the translucent identification member 14 by, for example, formatting the obscured identifiers 38 for printing and sending the information to a printer 814 or other device which then prints out or manufactures the translucent identification member 14. Hence the translucent identification member serial number 44 is assigned by the translucent identification member issuer 12 and is associated (e.g., linked) with the one or more obscured identifiers 38 and with the user in memory 22 in a database.

The translucent identification member issuer 12 may include an information randomizer 900 and a translucent identification member formatter 902. The information randomizer 900 may use the translucent identification member serial number 44 as other information 34 to be combined with the recipient specific information 32 to generate the one or more obscured identifiers 38. This may be done using a hash algorithm or other suitable encoding technique as desired to generate the one or more obscured identifiers 38. The translucent identification member formatter 902 may be another software application executing on a suitable processing device or devices that formats the information for output to a printer or other manufacturing device.

Figure 10:
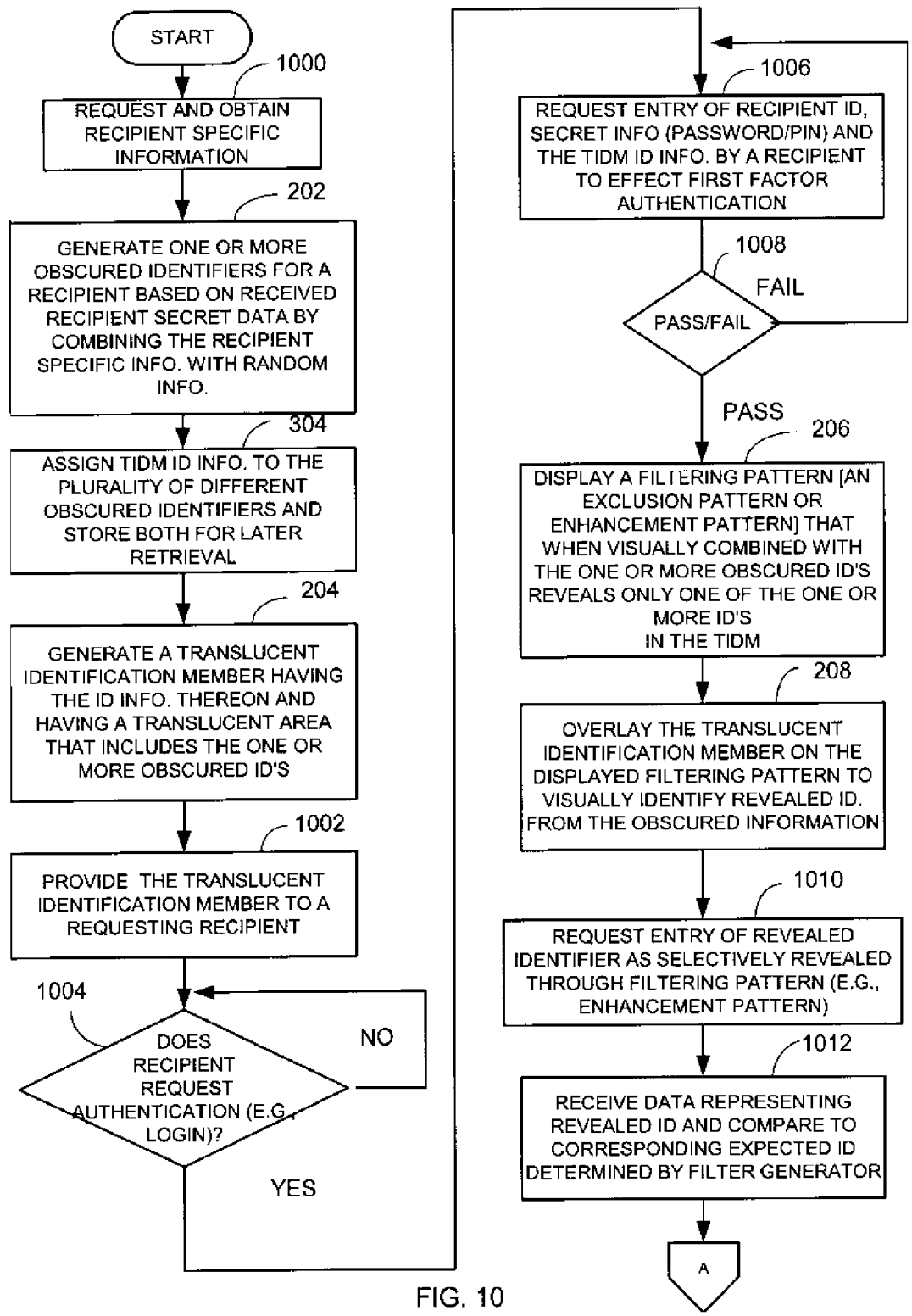
FIGS. 10 and 11 illustrate a flowchart showing one example of a method for securely providing identification information in accordance with one embodiment of the invention.
Figure 11:
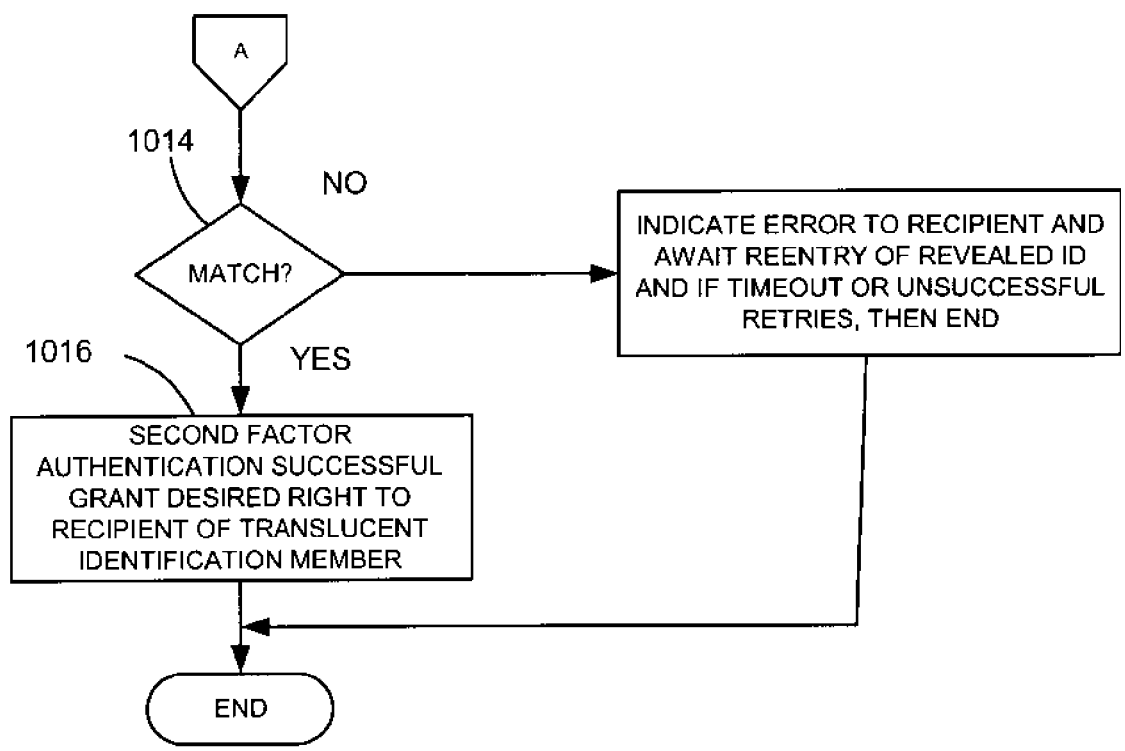

FIGS. 10 and 11 illustrate another embodiment of the operation of the system after the issuance of the translucent identification member has occurred. As shown in block 1000, the method includes requesting and obtaining recipient specific information 32 such as previously described with reference to FIG. 5. Once the translucent identification member 14 has been printed or manufactured, it is then provided to the recipient by hand or through mail or any other suitable technique as shown in block 1002. As shown in block 1004, a bank server of a bank determines if a recipient has requested authentication, such as to a logon request. If a request has been received, a web page may be sent requesting entry of the recipient information 32 including the password and the translucent identification member serial number 44 as a first level of a multi-factor authentication process as shown in block 1006. This may be done for example through the screen shown in FIG. 5. As shown in block 206, the bank server determines whether the entered recipient specific information 32 and password and translucent identification member serial number 44 are correct for example by passing along the information to the translucent identification member authenticator 24. If the first authentication level passes, the method includes, as shown in block 1010, displaying the visual filtering pattern 44 that when visually combined with the one or more obscured identifiers 38 on the translucent identification member 14, reveals only one of the one or more obscured identifiers as the appropriate identifier to be entered for the current session or transaction. The bank server may then, through the web server, request entry of the revealed identifier 700 as selectively revealed through the filtering pattern displayed on the display by providing the screen as shown in FIG. 6. This is shown in block 1010. In response to the request, the translucent identification member authenticator 24 receives the revealed one time use identifier 700 and compares the received identifier to a corresponding expected ID determined for example by the visual filter generator or authenticator 24. This is shown in block 1012. Given the "filter", the user's data entry and stored information about that user, the authenticator can validate whether the user entered correct data or not (either on its own or by passing it to a "server"). If the desired identifier is generated before requesting it from the user, the system also generates the right filter to reveal the pre-determined identifier (all before presenting to the user). Alternatively, if the user is provided with a pattern (the filter) and then the system validates the identifier that the user entered with the identifier that would have resulted from that pattern, a desired identifier need not be picked ahead of time and the "filter generator", therefore does not require knowledge of anything else. The data representing the visually revealed identifier (e.g., the data itself, an encrypted form thereof or other suitable data, may also be received using a device other than the device on which the visual filtering pattern is displayed. For example, the identifier may be revealed on a screen of one device and a handheld device or non-handheld device may be used to enter and send the visually revealed identifier to another device or system that checks whether there is a match.

As shown in block 1014 if a match does not exist, the recipient will be sent an error and requested to re-enter the revealed identifier. The system may change to using a different identifier for the re-try. Also, the system may lockout the user after a certain number of failed attempts. However, as shown in block 1016, if a match occurs, second factor authentication is determined to be successful and the user is granted the desired right.

Figure 12:
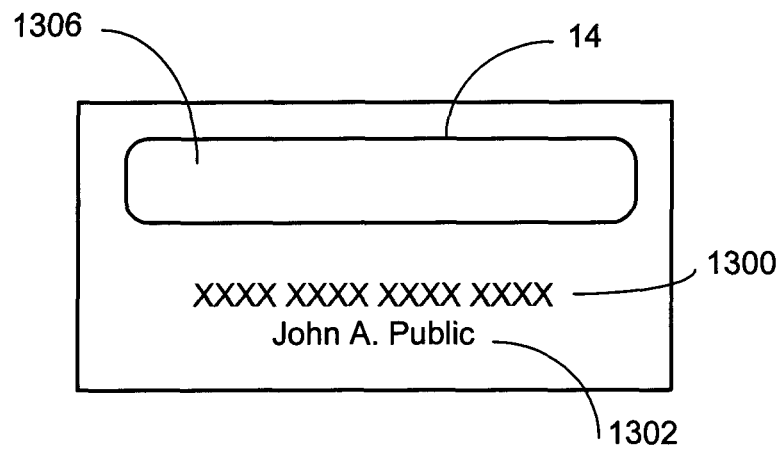
FIG. 12 illustrates one example of a transaction card including a portion containing a translucent identification member in accordance with one embodiment of the invention.
Figure 13:
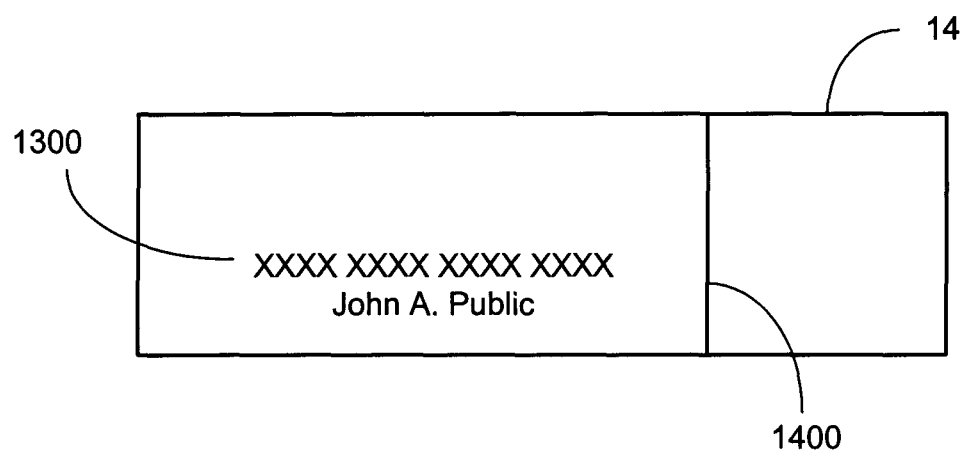
FIG. 13 illustrates another example of a transaction card that contains a translucent identification member in accordance with one embodiment of the invention.
Figure 14:
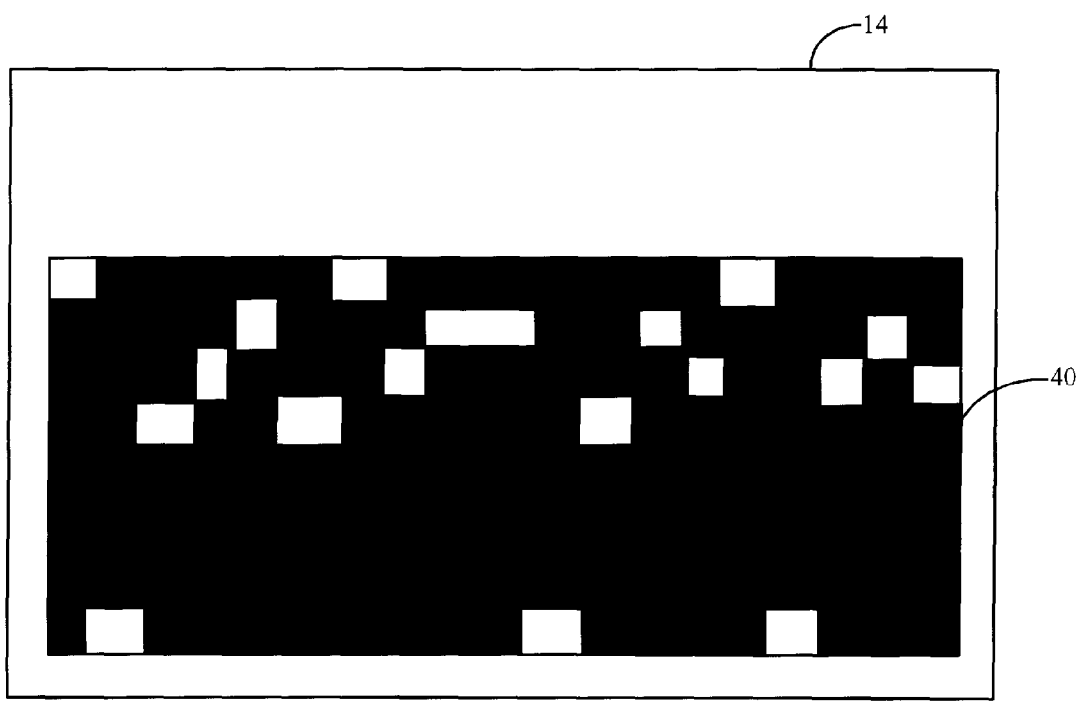
FIG. 14 is a diagram illustrating one example of a secure identification information member in accordance with another embodiment of the invention.

FIG. 12 and FIG. 13 illustrate examples of transaction cards that employ translucent identification members 14 (including the type shown in FIG. 14). The transaction cards may be smart cards or non-smart cards and have the conventional information associated with credit cards, debit cards, or any other suitable transaction cards and in addition include the translucent identification member 14. The translucent identification member 14 appears on a portion of the transaction card. One portion of the transaction card includes account information such as an account number, credit card number, or any other suitable identifier 1300 and if desired, other user identifiers such as a user name 1402. In an example shown in FIG. 12, the transaction card includes an opening 1306 that may be, for example, cut in the plastic transaction card or otherwise provided in the plastic card and a translucent identification member 14 with adhesive may be placed over the opening or may be integrally molded therein or otherwise attached such as but not limited to a connecting structure configured to receive and hold the TIDM in or to the transaction card so that the size of the transaction card is the same size as conventional transaction cards or any other suitable size as desired. If used, the connecting structure may be a snap fit structure, slide in structure, adhesive based connection or any suitable connecting structure as desired.

FIG. 13 illustrates a different example in which the translucent identification member 14 is attached to a side surface or any other surface of a conventional transaction card. The translucent identification member 14 may be foldable along a fold line 1400 or may be of a thickness wherein it is non-foldable and formed as part of the transaction card if desired. Any other suitable mechanisms for suitably attaching the translucent identification member with or to a transaction card is also contemplated.

Figure 15:
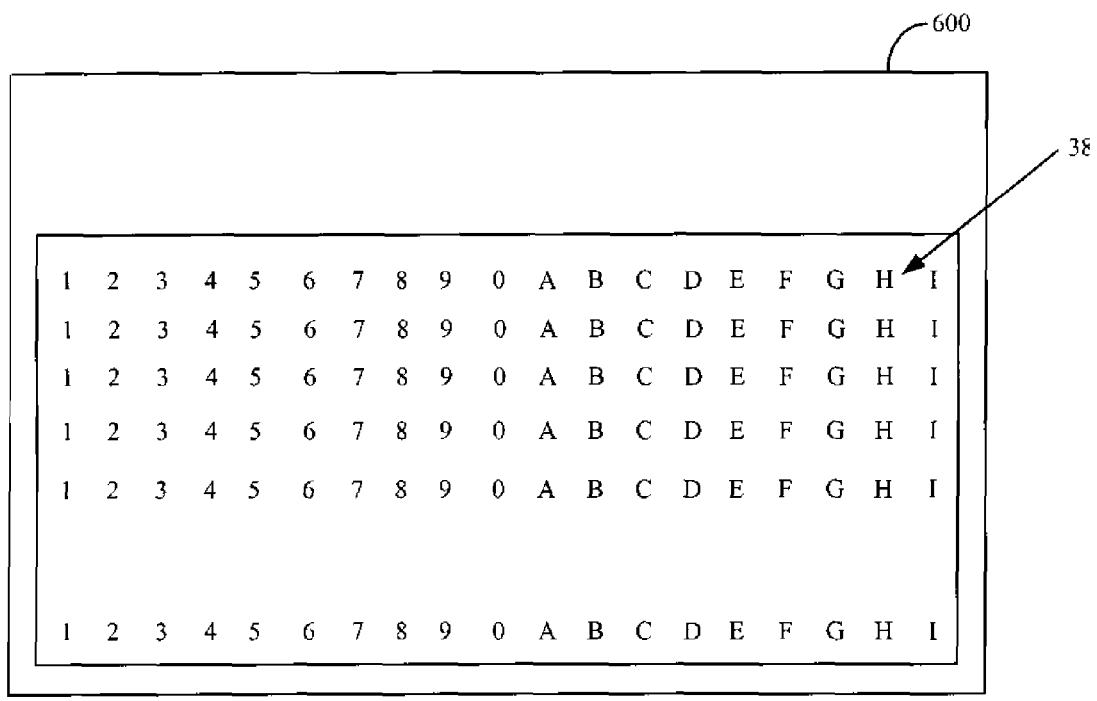
FIG. 15 diagrammatically illustrates one example of displayed obscured identifier information in accordance with one embodiment to the invention.

FIGS. 14 and 15 illustrate an alternative embodiment that basically reverses the role of the translucent identification member and the recipient unit. In this embodiment, the translucent identifier 14 contains the visual filtering or enhancement pattern 40 and the display screen displays at least one obscured identifier that may be for example data representing user authentication data that is unique to a user or non-unique to a user as desired (see FIG. 15). As with the previous embodiment, the combination of overlaying the translucent identification member (visual filter) over the display that displays an obscured identifier, reveals (un-obscures) or enhances the at least one obscured identifier on the screen. The revealed user authentication data may then be entered into a suitable transaction device as the password or other user authentication information. Also, when the translucent area is attached or incorporated in a conventional transaction card, the transaction card includes as shown for example on FIGS. 12 and 13, a first portion containing a transaction card number and a second portion containing a translucent identification number or other identifying information having a translucent area that includes a visual filtering pattern.

Figure 16:
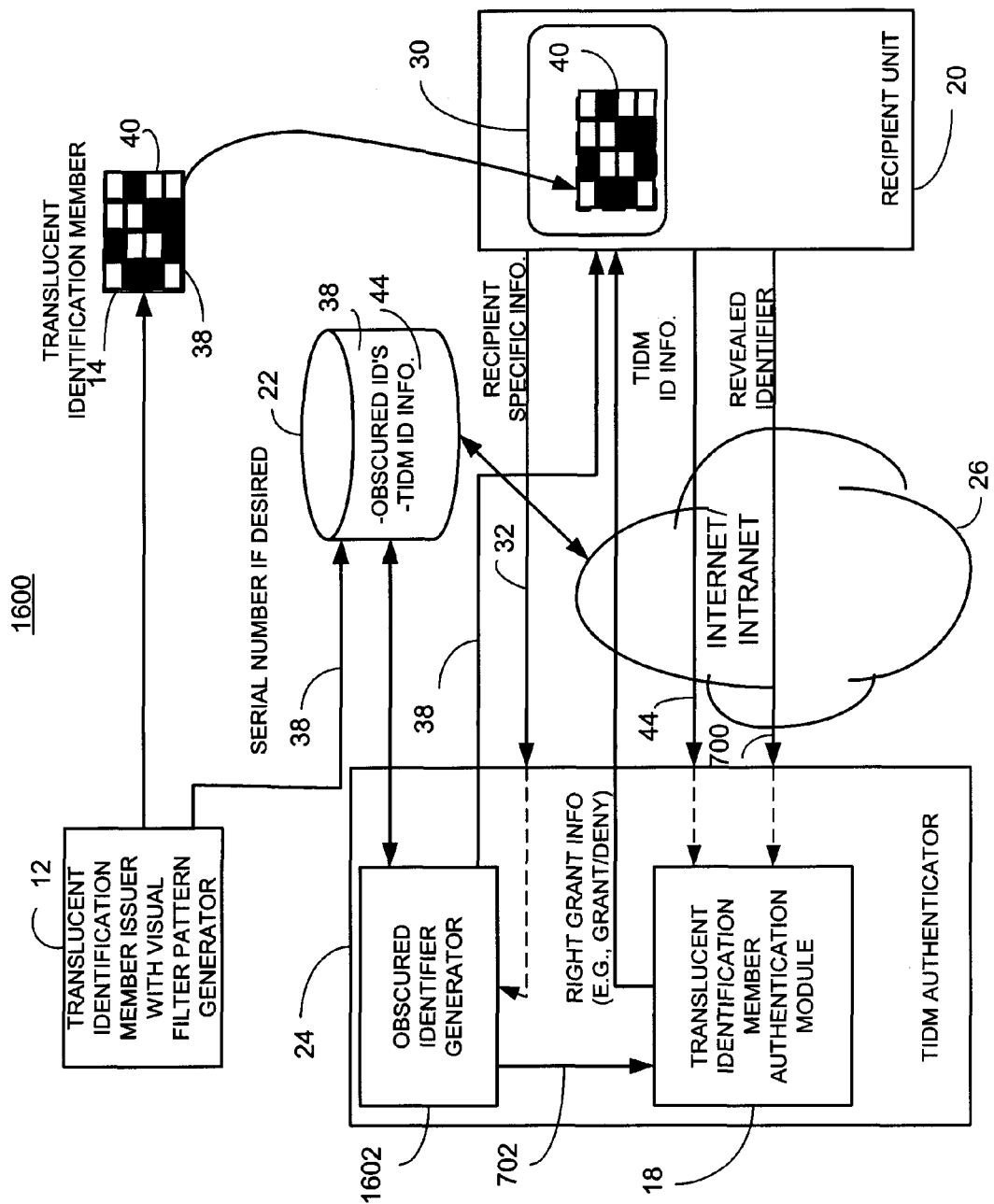
FIG. 16 is a block diagram illustrating another example of a system for securely providing identification information in accordance with one embodiment to the invention.

FIG. 16 illustrates one example of a system 1600 employing the TIDM 14 of FIG. 14. In this example, the TIDM authenticator 24 includes an obscured identifier generator 1602 similar to the type used to generate the one or more identifiers described with reference to FIG. 1. The obscured identifier generator 1602 generates the obscured identifier(s) after receiving recipient specific information from a user, such as a user name, TIDM serial number, or other suitable information, to insure that the proper obscured identifier is displayed for that user. As part of the registration process, the user may have already provided the same user specific information and the obscured identifier generator 1602 may have already generated the obscured identifier and stored them in memory 22.

The translucent identification member issuer 12, in this example generates a TIDM 14 having a translucent area having a visual filtering pattern 40 thereon configured to visually filter a displayed obscured user identifier(s) 38 and is configured to overlay at least a portion of a display screen. Having a user enter in user specific information to initiate a session may be desirable where the same filtering pattern is printed on translucent identifier members for a plurality of users. It is desirable to know that the holder of the TIDM is a proper user as opposed to a thief that stole the TIDM. The authenticator, or other source, sends the generated obscured identifier to the recipient device. The recipient device displays the at least one visually obscured identifier as user authentication data and receives data representing the revealed user authentication data (such as the revealed ID itself or a representation of it) based on the translucent identification member having a filtering pattern thereon. For example when the translucent identification member having the filtering pattern thereon is held over the display, the filter reveals the user identifier. If desired, a translucent identifier serial number can be assigned to each TIDM even though the same filter pattern may be printed on more than one TIDM. As such, several users may have translucent identification members with the same filter pattern.

The translucent identification member issuer 12 is operative to generate a translucent identification member 14 having a translucent area that includes a visual filtering pattern 40 thereon configured to visually filter a displayed obscured user identifier and configured to overlay at least a portion of a display screen. The obscured identifier generator 1602 generates at least one visually obscured identifier for display on a display, in response to received user information such as user specific information. The translucent identification member authenticator 18, in this example receives data representing the revealed identifier such as through the user entering the information through a user interface after the filtering pattern is overlayed on the display and as previously described, the translucent identification member authenticator compares the received revealed identifier with a corresponding expected identifier (since it was generated by the obscured identifier generator) to determine whether proper authentication of a recipient is appropriate. Alternatively, the translucent identification member authenticator may send the received revealed identifier to a third party that carries out the comparison and sends a message back to the authenticator or recipient unit. Any other suitable division of operations may also be used as desired. The translucent identification member authenticator or third party then sends right-grant information to a recipient unit in response to the received data matching the corresponding expected identifier.

Figure 17:
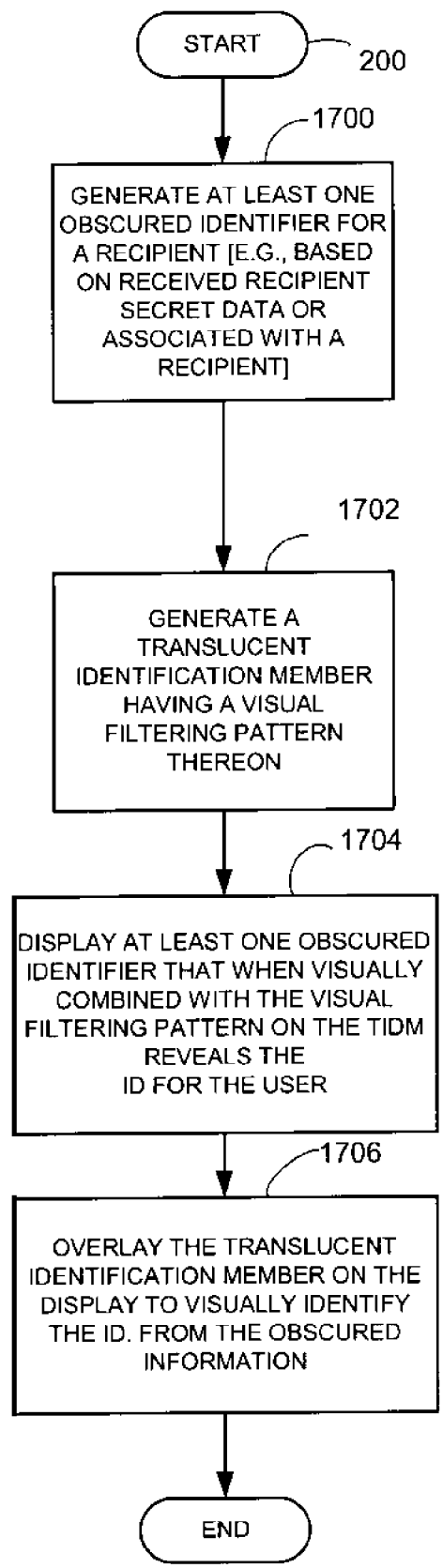
FIG. 17 is a flow chart illustrating one example of a method for securely providing identification information in accordance with one embodiment to the invention.

FIG. 17 illustrates one example of a method for securely providing identification information that includes generating at least one obscured identifier for a recipient based on, for example, received recipient secret data or non-secret data or data that is not related to or received from the recipient. This is shown in block 1700. As shown in block 1702, the method includes generating a translucent identification member 14 having a visual filtering pattern 40 thereon. After the TIDM has been made, the method includes receiving user identification information, such as a PIN: or other data as a first factor of authentication for the user. As shown in block 1704, the method includes sending the one or more obscured identifiers to the recipient and displaying at least one visually obscured identifier as second factor user authentication data, that when visually combined with the visual filtering pattern 40 on the translucent identification member, reveals an obscured identifier for a user. As shown in block 1706, the method includes, the user for example, overlaying the translucent identification member on the display to visually identify the obscured identifier through the filter. The method also includes receiving data representing the revealed user authentication data based on the translucent identification member having a filtering pattern thereon. The method also includes receiving user specific information, such as prior to the step of displaying the obscured identifier, to determine the visually obscured identifier to be displayed on the display. For example, the system needs to determine which obscured identifier to display since each user preferably has a different identifier. This may be determined for example by having the user enter user specific information, through a user interface in the recipient unit, such as a password or other secret or non-secret information as desired.

Stated another way, the method includes receiving user identification information as a first factor of authentication for a user and using, such as by the TIDM authenticator, service provider or other suitable entity, such user identification information to identify a translucent identification member in memory containing a particular visual filtering pattern known to have been associated with such user. The method includes generating an expected identifier to be used as a second factor of authentication for the user associated with the received user identification information and generating a pattern of obscured user identifiers containing the expected identifier such that when the pattern of obscured user identifiers is combined with the visual filtering pattern on the identified translucent identification member associated with the user the expected identifier will be revealed. The method includes transmitting the pattern of obscured user identifiers to a display (e.g., a displayed GUI) and requesting entry of a revealed identifier; and receiving data representing the revealed identifier. As noted above, the TIDM authenticator for example, or any suitable number of servers, or devices act as the circuits to carry out the above operations.

The primary functionality of the disclosed apparatus, methods and systems may be provided through application programming interfaces (APIs) that are executed by one or more processing devices that can be readily integrated into current infrastructures. In addition, each translucent identification member in one embodiment is different and has seemingly different random information since the seemingly random information is typically, but not necessarily, generated from information unique to a recipient, such as a password, user name, personal identification number, or any other information. In each embodiment, translucent identification members, and/or visual filters and/or obscured identifiers can be pre-manufactured and subsequently associated with a user. Additionally, the obscured identifiers and/or filtering patterns can be pre-generated and subsequently applied to translucent identification members. Such subsequent application to translucent identification members may be done by the creator of the filtering patterns or obscured identifiers or may be done by the entity providing the service or by a third-party contractor of the service provider. Since the manufacture of translucent identification members can be done with very simple materials such as transparent plastic, it is also possible for the service provider to send the obscured identifiers or visual patterns to users who can then themselves, apply the filtering pattern or obscured identifiers to a translucent identification member.

The same translucent identification member may be used a repeated number of times since there may be a plurality of different obscured identifiers thereon wherein each time authentication is requested a different one of the obscured identifiers is exposed through the visual filtering pattern. Hence the visually revealed identifier on the translucent identification member can change during each authentication session if desired. The translucent identification members described herein may be used for user authentication, activating software applications or for any other suitable purpose. The different obscured identifiers may be characters, images, or any other suitable information.

Figure 18:
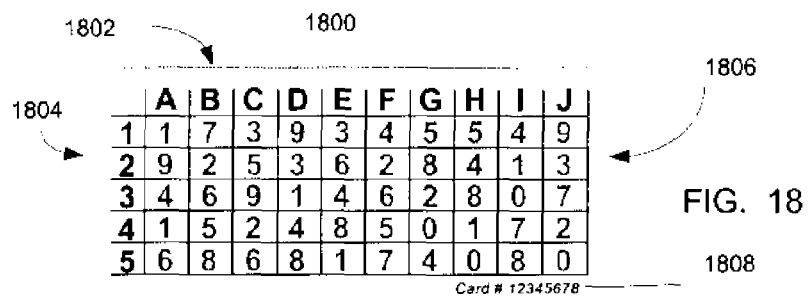
FIG. 18 is an illustration representing one example of an article, such as a card, that may be used in a method for providing electronic message authentication according to one embodiment of the invention.

FIG. 18 illustrates one example of an article 1800 (e.g. a member), such as a translucent or non-translucent film, sticker, card, or any other suitable material or article. It will be recognized that the information shown on the article 1800 is shown as one example only and it will be recognized that any suitable information may be used. In this example, the article 1800 includes location information 1802 and 1804 (shown as row and column indicia) respectively and sender authentication information 1806 in the form of numbers that are addressable or locatable by the coordinate location information (e.g. row and column information). In addition, the article 1800 includes an optional article identifier 1808 such as a serial number generated (e.g. assigned) by the issuer of the article 1800.

Generally speaking, the article 1800 if desired, may be generated as described above with respect to the translucent identification member to generate for example the sender authentication information. However, in addition the location information 1802 and 1804 also needs to be added in one embodiment. In addition, it will be recognized that the translucent identification member 14 may also be used as a sender authentication article and that the obscured identifiers 38 may also serve as sender authentication information.

In addition, in this embodiment there need not be recipient specific information if the system does not require it, as the sender authentication information may be generated either independent from or based on recipient specific information if desired. This may occur when the recipient signs up for the service. In addition, as used herein, location information includes the information, for example, sent with a message or indexed by a message sent by the sender which indicates which sender authentication information on the article 1800 that the recipient is to verify. For example, location information need not be row and column information, but may merely be the terms such as "upper left corner", "lower left corner", "third from the right", or any other suitable information to notify the recipient which sender authentication information on the article is to be used as the authentication information for the given session, transaction or other communication. Alternatively, the sender authentication information can be a pointer to a location that contains the sender authentication information, such as, for example, a universal resource locator (URL) that points to the sender authentication information for the given session, transaction or other communication. Additionally, the location information can be a pointer to a location that contains the actual location information, which in turn indicates where to look on the article for the sender authentication information for the given session, transaction or other communication. In another embodiment, the location information is a visual filtering pattern.

Figure 19:
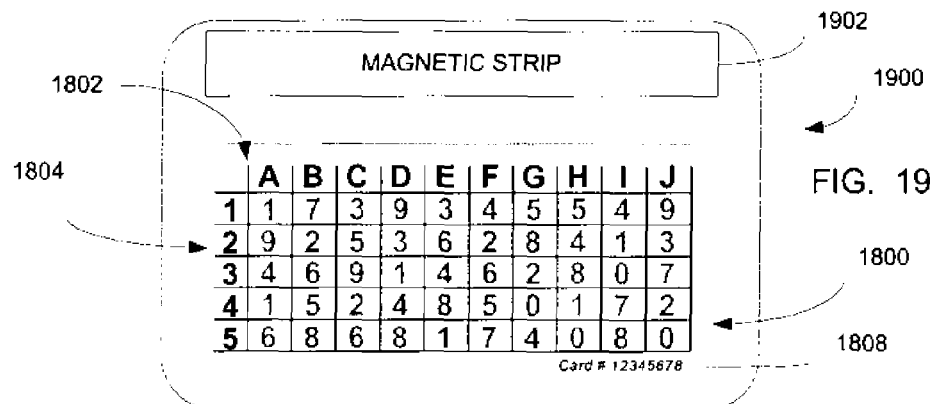
FIG. 19 illustrates one example of a transaction card that includes sender authentication information and location coordinate information for use in providing electronic message authentication in accordance with one embodiment of the invention.

FIG. 19 illustrates a transaction card 1900 that may include, for example, a magnetic strip 1902 or any other suitable information that may provide account information or message sender information. The transaction card 1900 may be for example a banking card, credit card, debit card or any other suitable transaction card as described above and may include transaction card identifier information such as a card number etc., as described above. This transaction card 1900 is different from conventional transaction cards because, among other things, it includes the article 1800 thereon (or member), therein or secured thereto in any suitable manner. As such, variations of the transaction card 1900 are illustrated for example in FIG. 13. In one example, the member 1800, such as a piece of adhesive backed paper or any other suitable member, is secured to a conventional transaction card if desired. It will also be recognized as described above that the member or article may be secured or suitably affixed in any suitable manner including, but not limited to adhesive, or any other suitable mechanism. The member 1800 may also be sent to a recipient as a tear away portion of a financial statement, billing statement etc. Preferably it is sized to fit on a transaction card.

FIG. 20 illustrates one example of a method for providing electronic message authentication that may be carried out by any suitable element. In this example, it may be carried out for example by a server or plurality of servers or other suitable applications executing on one or more processing devices. As shown in block 2000, the method includes, for example, when a sender such as a bank server or other message sender wishes to send a message to a recipient, determines desired location information, such as a row and column that also exists on the particular recipient's article, and corresponding desired sender authentication information to be sent and matched with sender authentication information located on the article and is locatable according to the sent location information. This may be done for example by accessing a database that links a recipient's email address for example, to corresponding database fields that represent for example the content of an article that was issued for that recipient. As shown in block 2002, the method includes sending the electronic message and both desired location information and corresponding desired sender authentication information, to the recipient wherein the desired sender authentication information is locatable on the article based on the sent desired location information. As such, for example, the sender or sending unit may associate (e.g., append, pre-pend, insert or otherwise attach) row and column information and corresponding sender authentication information that should appear at those locations on the article as part of an electronic message to a recipient. The recipient may then locate, based on the received column and row number, the sender authentication information on their article that was issued to them by (or on behalf of) the sender, and confirm that the sent desired sender authentication information matches the same information at the locations indicated by the sent location information sent by the sending unit. If a match occurs, then the recipient trusts the sender of the message. It will be recognized that the sent location information and sender authentication information may be the data itself, an index to, function of, reference to, or any other suitable representation of either of both the location information and the sender authentication information.

For example, the location coordinate information and corresponding sender authentication information could include electronically transmitted data for display on a display device, such as a visual filtering pattern and sender authentication information. In this embodiment, the article would be a transparent article to allow a user to place the article over an area of a display screen. The sent message would include the visual filtering pattern along with the desired sender authentication information that should appear visually to the user when the user overlays the article on a display screen. If the recipient visually recognizes or sees the sender authentication information that is revealed through the visual filtering pattern on screen with the sent desired sender authentication information and it matches, then the user can trust the sender of the message. As such, visual filtering techniques as previously described with respect to the translucent identification member for recipient authentication may be used in part to authenticate a sender.

Figure 21:
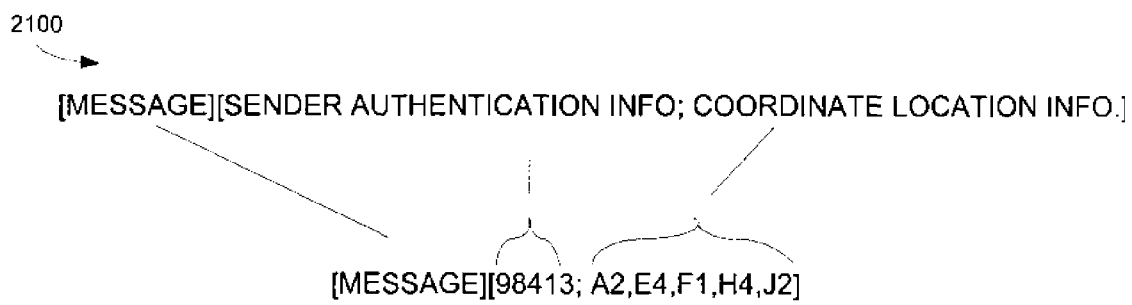
FIG. 21 is a graphic illustration showing one example of a message with appended sender authentication information and location coordinate information in accordance with one embodiment of the invention.

Referring also to FIG. 21, a specific example of a message and associated sender authentication information and location information is shown as 2100. In a particular embodiment, also referring to FIG. 18, the message is appended with sender authentication information and in particular numbers "98413" and coordinate information of "A2, E4, F1, H4, J2". As such, the sending unit sends the electronic message along with both desired sender authentication information and desired location information as shown. The user then uses the article 1800 and looks, for example, at coordinate location A2 and sees the number 9, looks at the location coordinate E4 and sees the number 8, looks at the coordinate location F1 and sees the number 4, looks at the coordinate location H4 and sees the number 1, and looks at the coordinate location J2 and sees the number 3. If the user sees the same sender authentication information on the article 1800 as was sent by the sending unit, then the recipient trusts the sender as being an authentic message sender. In this example, the sender authentication information visually represents sender authentication information that is identifiable by location coordinate information in the form of rows and columns. However, it will be recognized that rows and column format need not be used and as such the cells as shown need not be employed. For example, if objects are used as opposed to letters and numbers, the objects may be located in upper left, upper right, middle or any other suitable location of the article and the sender authentication information, which could be the object can be sent such as in the form of a graphic or other suitable object, and the coordinate location information may actually be words that might read "upper left corner". Any other suitable coordinate location information or sender authentication information may also be used.

The article 1800 as noted above may be for example a piece of paper, a plastic card, transparent plastic card, sticker that can be affixed to existing plastic cards or any other suitable article. In this example, each email recipient is provided with the article with its own randomly (or seemingly randomly) generated contents. When sending an email, an originator's message transfer agent or other server component associates with each outbound email either directly or indirectly such as by a link to an HTML page using a URL or other suitable reference, coordinates or other directions for locating one or more of the card's cells or locations. Also appended, prepended, inserted, or otherwise attached to the email are the contents at those locations. Upon receipt, the user confirms the lookup results using their individual sender authentication article, such as reading the coordinates listed in the email and looking them up on their own sender authentication article. In the embodiment where a translucent version of the authentication article is used, the authentication article may be placed over a visual filtering pattern provided with the email and the revealed sender authentication information is compared by the recipient to the desired sender authentication information that is provided in the email. If the characters or other information do not match, then the authentication has failed.

FIG. 23 illustrates in more detail a method for providing electronic message authentication wherein the method includes, as shown in block 2300, generating for example, random sender authentication information to be placed on the article and if desired, location information that may also be placed on the article and linking the two with the selected recipient. Random includes pseudo random information or any suitable level of randomization of information. This may be done as described above with respect to the translucent identification member through a suitable interface on one or more server computers or any other suitable device. As shown in block 2302, this information is stored as the authentication information and corresponding location information in a suitable database. As shown in block 2304, the method includes creating an article, such as article 1800 containing the location coordinate information and corresponding sender authentication information and if desired an article identifier 1808 such as serial number for issuance to a specific recipient. This may be done, for example, in basically a similar manner as described above. For example, a card may be printed, a transaction card may be suitably formed, or a sticker may be generated that can be adhered to any suitable article. The article is then sent to the recipient by mail or any other suitable channel.

In an alternative embodiment, instead of using a type of hard token (e.g. article), a soft token may be used wherein the representation (may not be an actual image) of a card for example or representation of an article may be sent electronically for display via a display screen to a user or for other electronic access by such user, either during each session or once and the user may store the electronic sender authentication article in a file and may access it as necessary. As such the electronic representation of the article can be accessed by a software application so as to provide the recipient with the sender authentication information located at the location identified by the sent location information.

As shown in block 2306, the method also includes, for example as described above with respect to FIG. 20, determining, such as by the sender, at least one desired item of location information and corresponding sender authentication information to append, pre-pend, insert, or otherwise attach to the current message. Selection of the location information and authentication information may be done in any suitable manner, such as randomly or in any other suitable fashion as desired. As shown in dashed block 2308, in an alternative embodiment, location information and sender authentication information is effectively communicated in the form of a visual filtering pattern that may, if desired, cover up all row and column headings and instead just allow the sender authentication information to be visually displayed when the article is overlaid. As such, the method may include sending a visual filtering pattern for display to the recipient to allow the recipient to visually determine whether the sender is authentic. The recipient may place at least a portion of the sender authentication information that is on the article, over a visual filtering pattern that is displayed on the display screen, to determine whether the sent sender authentication information with the message matches the sender authentication information made visible by the visual filtering pattern.

In one example the method includes appending at least one desired item of location information and corresponding sender authentication information to an electronic message for a recipient. The sender authentication information visually represents authentication information identifiable by the location coordinate information. As such, the message itself may be appended, pre-pended, inserted, or otherwise attached to the information or may contain a reference to the information such as a website or any other suitable link or any other suitable representation of the sender authentication information and location coordinate information.

As shown in block 2310, the method includes sending the electronic message and data representing both the location coordinate information and the corresponding sender authentication information to a recipient. The recipient may then look at the information on the article and see if it matches that which was sent by the sending unit.

It will also be recognized that determining at least one location coordinate, based on the location information and corresponding sender authentication information may be done, for example, dynamically as opposed to looking up the information stored in the database. For example, the sender (e.g. message sending unit) may simply be programmed with a function to generate sender authentication information to send as opposed to looking up pre-stored information.

Also if desired, the sender authentication information may be information for example, such as the ending balance on a bank statement, any suitable information in a billing statement or account statement that the sender may have previously sent to the recipient that may contain the sender authentication information. The location information may be the date of a particular statement and the sender authentication information may be the current balance on a credit card account. Any other statement may also be used or any other information known to, or provided by, the sending unit that is in the possession of the recipient may be used.

Figure 22:
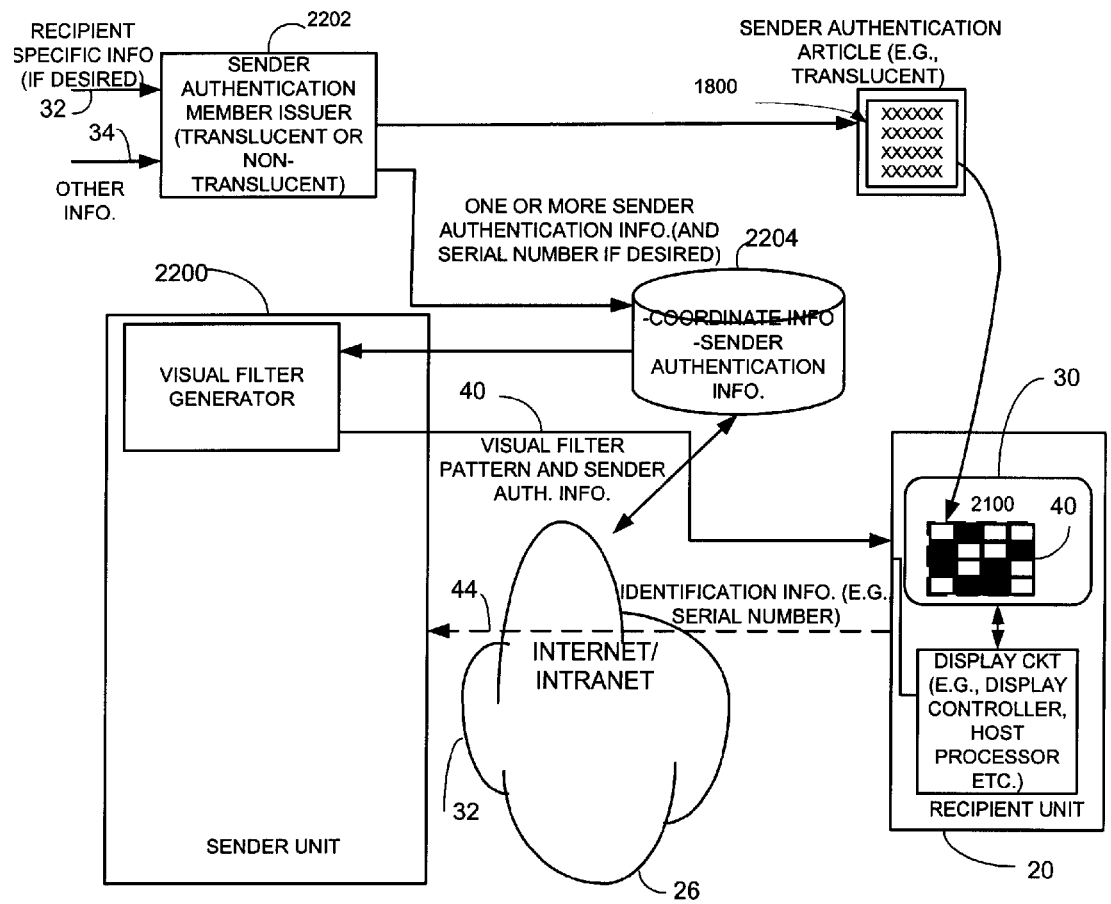
FIG. 22 is a block diagram illustrating one example of a system for providing electronic message authentication in accordance with one embodiment of the invention.

FIG. 22 illustrates one example of a system for providing electronic message authentication that may, if desired, carry out the steps described with reference to FIG. 23. For example, a sending unit 2200, such as any server computer, plurality of servers, mobile devices or any other suitable structure may include a sender authentication article issuer 2202, or a third party may issue the sender authentication article as desired. For example, the sender authentication article issuer 2202 may generate the random sender authentication information and corresponding location coordinate information and link it with a recipient and store the information in the database 2204. The article 1800 may then be mailed, for example, to a recipient, or in the case of a soft token, sent electronically to the recipient. In this illustration (FIG. 22), a translucent article is shown. As such, the recipient 20 includes a display 30 and the message 2100 for example is displayed on the display along with a visual filtering pattern and the sent sender authentication information. The visual filtering pattern is then used to reveal the expected sender authentication information that is then matched by the recipient to that sent in the message 2100. In this embodiment where the sender authentication article is a translucent type, the visual filtering pattern sent by the sender unit embodies location information since the result of the recipient overlaying the sender authentication article on a display screen will result in a visually revealed sender authentication information at particular locations in the article. As such, the visual filtering pattern includes the location information. In addition, it will be recognized that the term information refers to any suitable indicia.

The sending unit 2200 which may be a suitable server in a network, node, or any other suitable device, includes one or more circuits which may be in the form of one or more processing devices that execute software instructions that are stored in memory, or may be implemented using discrete logic, or any suitable combination of hardware, software or firmware to carry out the operations described herein. As such, the sender unit 2200 includes circuits that are operative to carry out the steps as described above.

In another embodiment, the use of the sender authentication article may be combined for example with the systems described above with respect to the translucent identification member such that the translucent identification member includes the location information and sender authentication information thereon. For example the obscured identifiers if desired may also serve as the sender authentication information or in an alternative embodiment the translucent identification member may have a portion that includes the obscured identifiers and another portion that includes the location information and sender authentication information. In any event, use of a single article or member which is translucent as described herein can provide multi-level authentication. For example, for sender authentication, the methods described above with respect to FIGS. 18-22 may be employed to confirm that the sender is authentic. Once a recipient for example is convinced that the sender of an email is authentic, the recipient may then click on a URL sent in the email message and then be presented with a suitable HTML form to enter account information or other confidential information. However, prior to entering this confidential information a second level of authentication may be carried out employing the translucent identification member and obscured identifiers so that the sending unit can authenticate the recipient at this stage of the session or transaction. It will also be recognized that any other suitable ordering of operations or combinations of the authentication schemes may also be employed.

In addition use of the claim terms includes any representation thereof. For example the term sender authentication information includes the data itself, any index to the data, any reference or pointer to the data, or any other representation thereof.

Among other advantages, there need not be any modification to a message transfer agent or email client of a recipient. Also if desired, no recipient computers need to be registered allowing authentication to be performed from any computer if desired. The system may also be applicable to mobile devices where lookup coordinates can be easily displayed on a small display screen. Other authentication purposes may include web authentication, interactive voice response authentication or any authentication scenario. In addition, the system and methods offer a type of inexpensive mechanism such as the authentication cards that can be distributed versus more complex technologies that may require smart cards, tokens or public key infrastructures. Other advantages will be recognized by those of ordinary skill in the art.

Figure 24:
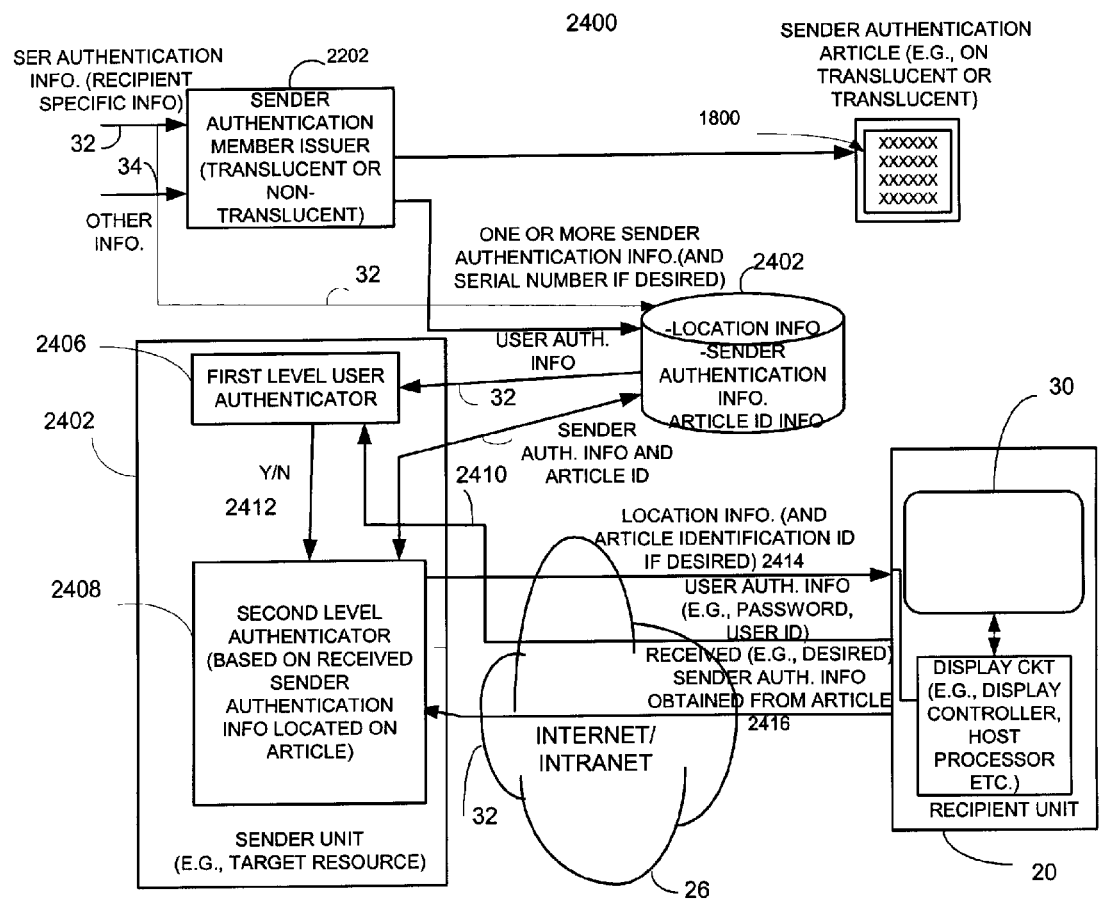
FIG. 24 is a block diagram illustrating one example of a system for providing mutual authentication between a user and a target resource in accordance with one embodiment of the invention.

FIG. 24 illustrates one example of a system 2400 that provides mutual authentication between a user (e.g. recipient unit) and a sender unit, also referred to as a target resource. As described for example with respect to FIGS. 18-23 and elsewhere, in this example, the article 1800 serves as an authentication card which is assigned to each end user and includes, for example, random and/or unique markings known only by the sender unit (e.g. target resource) and the end user. By providing evidence of that knowledge to the recipient, the sending unit can demonstrate its identity and by the end user causing the recipient unit to return information located in the authentication card, the end user demonstrates his/her identity as the proper end user.

As noted above, the system 2400 may include a sender authentication member issuer 2202 that produces the article 1800 based on, for example, recipient specific information 32 (i.e. user authentication information) which may be, but is not limited to, for example a password and/or user ID. The system 2400 also includes sender unit 2402 which may be a server or any suitable device as previously described and may also include, as noted above, a group of servers or circuits that carry out the operations described herein. The system 2400 also includes a database 2404 similar to the databases previously described which, in this example, also stores the user authentication information 32 to allow a first level user authentication operation to be carried out. In addition, as described above, the database 2404 also stores the sender authentication information that is located on the article as well as the article identifier so that the sender unit 2402 may provide the second level authentication process as described herein.

The sender unit 2402 also includes, for example, memory that contains executable instructions that when executed by one or more processing devices operates as a first level user authenticator 2406 and a second level authenticator 2408. As noted above, it will be recognized however that these operations may be carried out by separate servers or other computing units located or accessible through the Internet, an intranet or any suitable network. It will also be recognized that the communications described herein may be communicated wirelessly for example where the recipient unit 20 is a wireless handheld device or other suitable portable wireless device.

Figure 25:
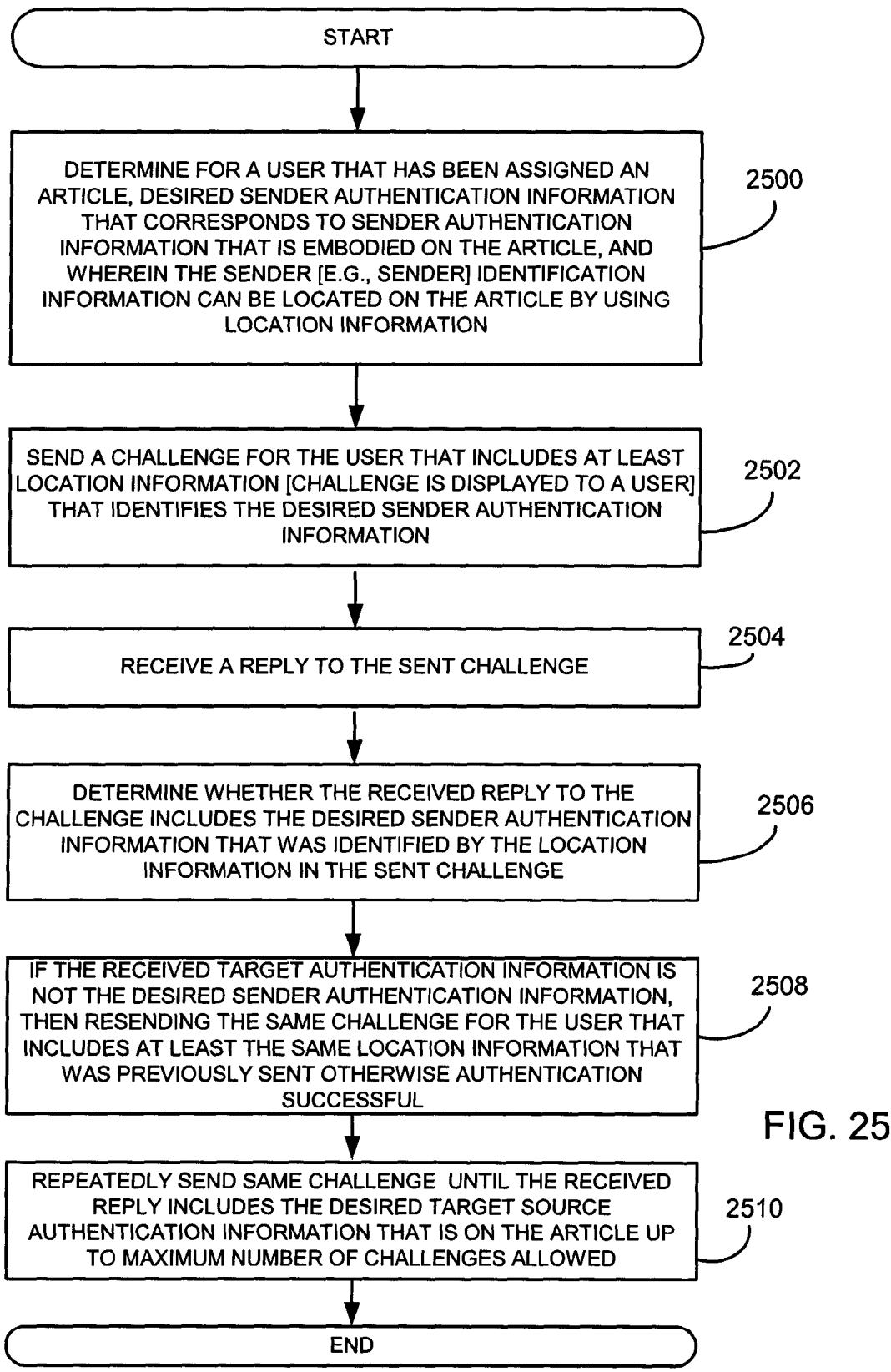
FIG. 25 is a flowchart illustrating one example of a method for providing mutual authentication between a user and a target resource in accordance with one embodiment of the invention.

Referring also to FIG. 25, a method for providing mutual authentication between a user and a sender unit, such as a target resource, is described. The article as noted above may include a transaction card, a card not having any transaction information, a translucent card, an electronic card (e.g. visually displayed card) that may be, for example, stored in memory on the recipient unit or any other suitable unit and then displayed to a user upon user request or automatically in response to receipt of the challenge, or the article may take any other suitable form. Also, the location information sent in the challenge includes, for example, electronically transmitted data for display in a display device. As noted above, this may take the form of row and column information or any other suitable information that may be electronically transmitted and, for example, displayed on display 30 for the user or audibly presented. It will be assumed that for this embodiment, a user has received the sender authentication article 1800 and in this example it is not a translucent article so that no visual filter need be used in this example. However, it will be recognized that the operations described herein may be suitably carried out for any suitable article including a translucent card or article. This method may be carried out, for example, by the system shown in FIG. 24, or by any suitable system or structure. In this example, article identification information need not be sent to the recipient unit by the sender unit 2402. However, it may be, if desired. In this example, the sender unit 2402 repeatedly checks to see whether a reply to a sent challenge includes sender authentication information that was identified by location information in a sent challenge matches expected (e.g., that desired by the sender) sender authentication information. If not, the challenge is repeatedly sent multiple times during a session, or over multiple sessions until the desired sender authentication information that is received by the sending unit matches the expected authentication information.

Although not shown in FIG. 25, a first level authentication process may be initially carried out. For example, this may include receiving user authentication information 2410 that may include, for example, a user password and user ID, from the recipient unit 20, and hence the user. This is received, for example, by the first level user authenticator 2406. The first level user authenticator 2406 then authenticates the user based on the received user authentication information 2410 by using the user authentication information 32 obtained, for example, from the database 2402. If they match, user authentication is successful. A "yes" indication 2412 is then sent to the second level authenticator 2408 indicating that a second authentication process may be carried out. It is preferable, for example, also that during the first level authentication process, a lock out mechanism is implemented such as one that limits the number of authentication attempts during this first level authentication process preventing a brute force attack. Upon successful completion of the first step of authentication, the user is prompted to authenticate with article specific information as described below.

As shown in block 2500, the method includes determining, for a user that has been assigned the article 1800, desired sender authentication information that corresponds to sender authentication information that is embodied on the article. This may be done, for example, by the second level authenticator 2408 suitably selecting sender authentication information from the database 2404 that is located on the article 1800 based on the user authentication information 32. As noted above, this indicia on the article is stored by the sender authentication member issuer 2202 in the database 2404. The sender authentication information can be located on the article 1800 by a user by using the location information, such as row and column identifiers, or any other suitable location information as described above.

As shown in block 2502, the method includes sending, such as by the sender unit 2402, a challenge for the user that includes at least location information that identifies the desired sender authentication information that can be located on the article 1800. A challenge may include, for example, one or more coordinate sets that are for example, displayed to a user via display 30. The challenge is preferably particular to each user and must be retrieved, based on the identity or user authentication information from the first level user authentication process. This ensures that the user is presented with the same challenge until successful authentication is complete. The repeating of the same challenge can prevent an attacker from mounting a brute force attack based on knowledge of only a few of the user's card contents which, for example, may have been obtained using various potential attack mechanisms. The randomly generated challenge is then carried out and stored once the user has successfully authenticated through a second level authentication process. The challenge 2414 may be sent in any suitable manner and may take any suitable form including, but not limited to, an SSL communication or non-secure communication if desired. As shown in block 2504, the method includes receiving a reply to the sent challenge. In this example, a reply designated as 2416 is received from the recipient unit 20 and is generated by the recipient unit under control of the user, for example, using the location information sent in the challenge 2414, such as a row and column ID to determine sender authentication information located on the card. The user enters this information through a suitable user interface in response to the challenge. As such, with respect to the embodiment of FIGS. 24-28, the reply includes desired (desired by the sender unit) sender authentication information obtained from the article. This reply information, although referred to as "sender authentication information" is actually used to authenticate the user by the sender unit, or other entity, since the reply contains information only obtainable by the holder of the authentication card.

As shown in block 2506, the method includes determining, such as by the sender unit 2402, whether the received reply to the challenge includes the desired sender authentication information that was identified by the location information sent in the challenge. As shown in block 2508, if the received sender authentication information in the reply is not the desired sender authentication information that was identified in the challenge by the location information, the sender unit 2402, in this example, then resends the same challenge containing the same location information that was previously sent, to the recipient unit 20. As shown in block 2510, the method includes repeating the steps of analyzing the received reply and if the reply does not include sender authentication information that was expected based on the location information sent in the challenge, the sender unit sends the same challenge during the same session, until the received reply includes the desired sender authentication information that is on the article or until a suitable number of tries have been attempted as set by the sender unit, for example. The challenge is repeated until the reply includes the expected desired sender authentication information.

Figure 26:
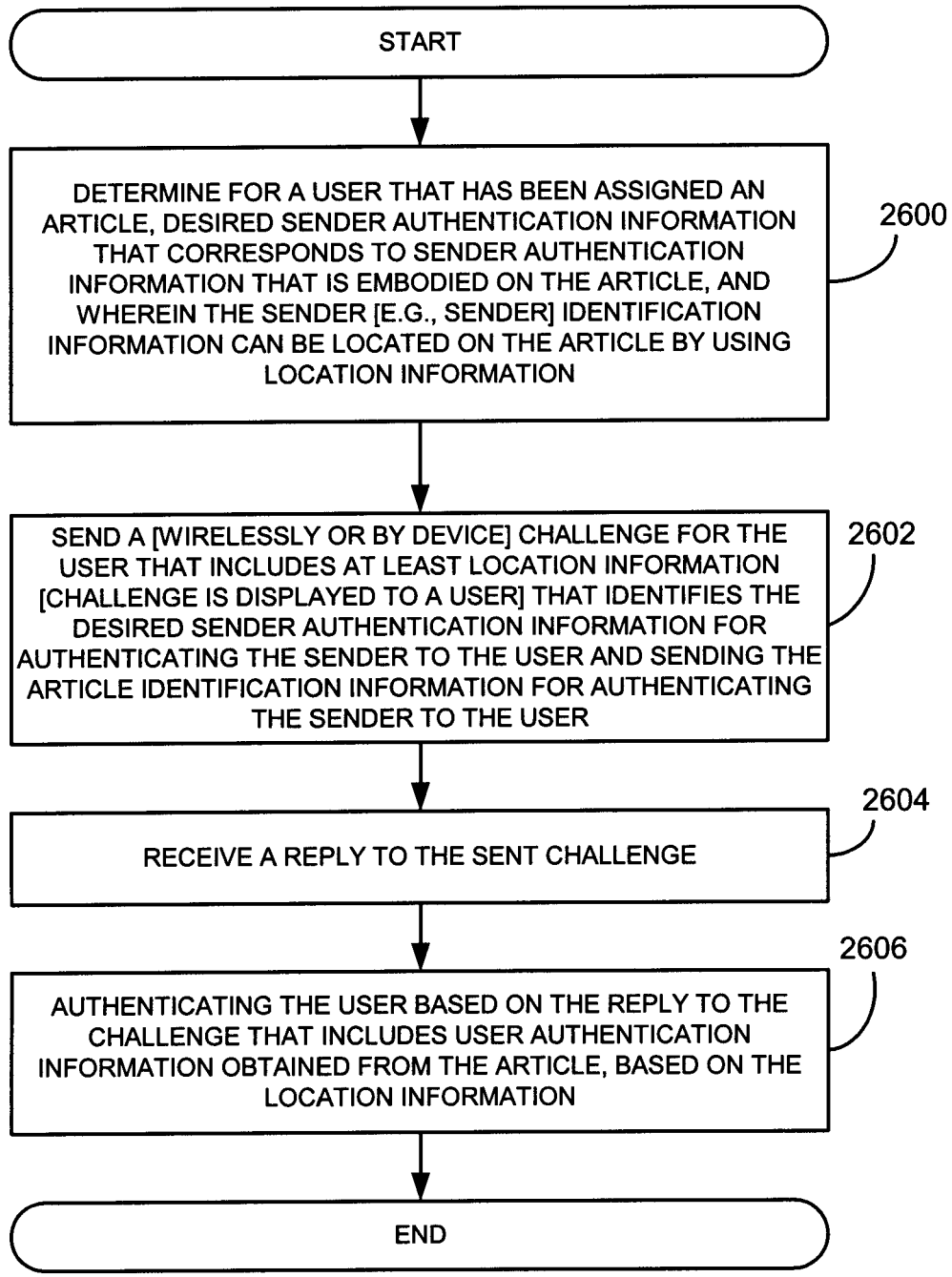
FIG. 26 is a flowchart illustrating an example of another embodiment of a method for providing mutual authentication between a user and a target resource in accordance with one embodiment of the invention.

FIG. 26 illustrates another method for providing mutual authentication between a user and a sender and may be carried out, for example, by the system 2400 of FIG. 24, or any other suitable system or devices. In this example, the repeated sending of the same challenge until a proper reply is received, is not carried out. In this embodiment, article identification information, such as a serial number located on the article, or any other suitable article identification is also sent to the user in addition to the location information in a challenge. As shown in block 2600, the method includes determining, such as by the sender unit 2402, desired sender authentication information that corresponds to sender authentication information that is embodied on the article and also determining for the same user, corresponding article identification information, such as the serial number on the article or shared secret or any other suitable identification information. As shown in block 2602, the method includes sending a challenge for the user that includes the determined location information and article identification information for authenticating the sending unit to the user.

As shown in block 2604, the method includes authenticating the user based on a reply to the challenge wherein the reply includes sender authentication information obtained from the article, based on the location information. In this example, the user does not, for example, enter or send a reply to the challenge unless the user verifies that the article identification information sent in the challenge, matches the article identification information on the article itself. As such, the user may authenticate the sending unit based on the article identification information. As such, in this example, the challenge includes article identification information in addition to the location information. The reply includes the sender authentication information located on the article, defined by the location information. If the article identifier in the challenge matches the article identifier on the article that is in the possession of the user, then the user trusts the sending unit. As shown in block 2606, the method includes authenticating the user based on the reply to the challenge. In this example, again a first level of authentication is preferably carried out that was previously described based on a user password and/or user ID. If that level of authentication is successful, then the method shown in FIG. 26 may be suitably carried out. As also noted, the article identification information may include a shared secret known to the user and to the sender or may be an article serial number, or any other suitable information.

Figure 27:
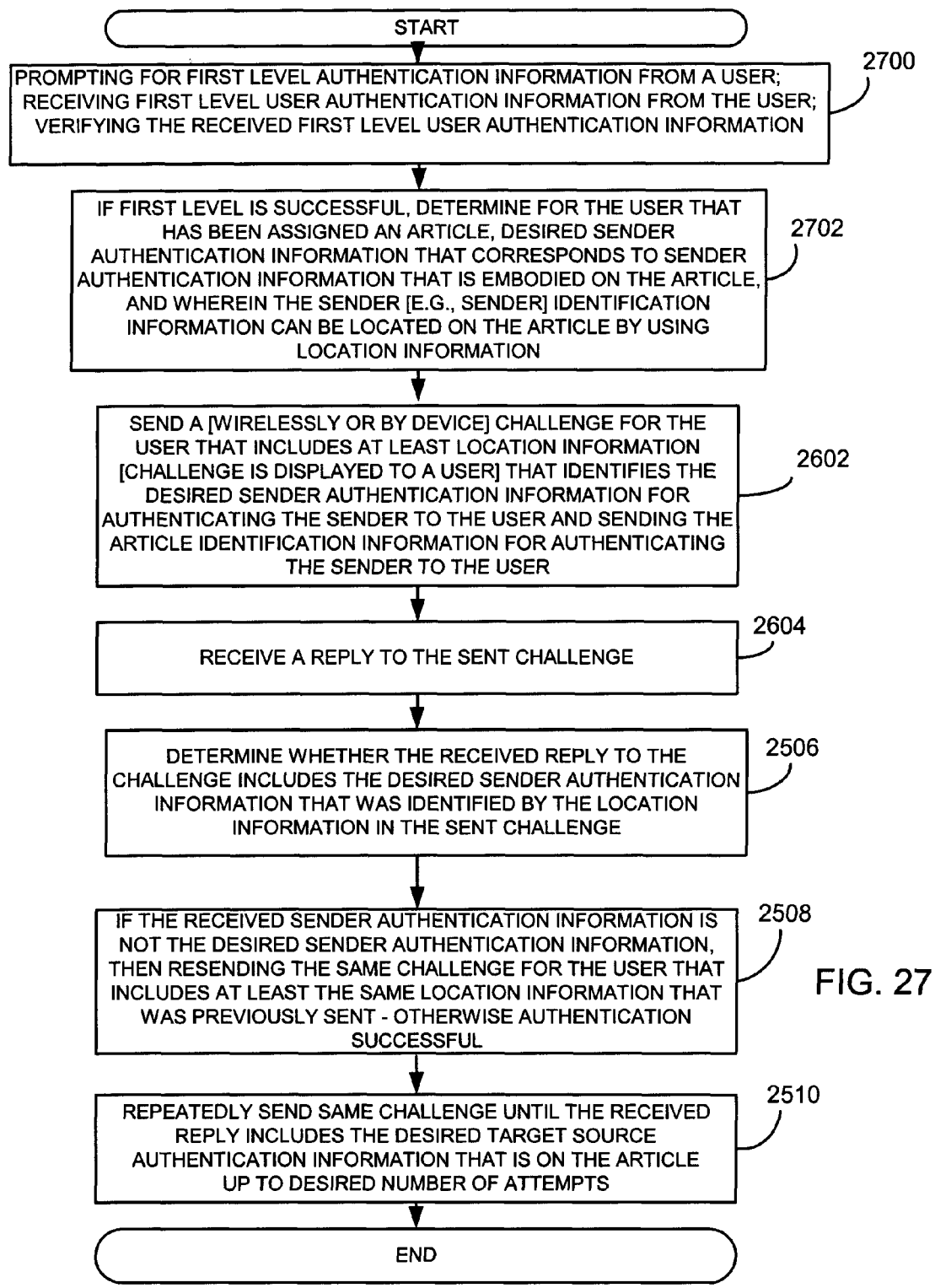
FIG. 27 is a flowchart illustrating another example of a method for providing mutual authentication between a user and a target resource in accordance with one embodiment of the invention.

FIG. 27 illustrates another method for providing mutual authentication between a user and sender which effectively combines some of the operations shown in FIGS. 25 and 26. As shown in block 2700, the method includes, performing a first authentication process such as by prompting for first level user authentication information. This may include, for example, the sending unit sending a request or providing a prompt for the user to enter a password and user ID. In response, the sending unit receives the first level user authentication information such as a password and stored user authentication information 32 (e.g. a hash of the received password) is verified to ensure that the received first level user authentication information is proper. As shown in block 2702, if the first level authentication is successful, the method includes determining for the user the desired sender authentication information that corresponds to the sender authentication information that is embodied on the article and determining, for example, article identification information that can be located on the article. As such, in this example, both location information and article identification information are sent in a challenge. The steps previously described with reference to FIGS. 25 and 26 are then carried out such that, for example, a challenge is repeatedly sent wherein the challenge is the same challenge until proper sender authentication information is received in a reply. As such, the user confirms that the display of an article identifier from the challenge matches the identifier on their card. This authenticates the sender unit or target organization as only it and the end user have knowledge of this identifier. The user inputs a suitable response to the challenge by looking at the contents of their card at the location information sent in the challenge. The sending unit can verify the reply and authenticate the user as only the end user with this card can correctly respond to the challenge. It will be recognized that the operations were described in the context of, for example, the Internet but the operations are equally applicable to other channels of communication such as interactive voice response or any other suitable communication system. For example, where interactive voice response is used, a user prompt would be provided by voice over a wireless or wire line telephony network from, for example, an automated system. A user response would be provided via touchtone keypads instead of, for example, through web form input. Any other suitable communication system may also be used.

Among other advantages, the described apparatus systems and methods provide secure authentication of both the end user and sending unit or target organization and may be relatively easy to use and relatively inexpensive to produce and distribute such as the authentication cards versus more complex technologies such as smart cards, hardware tokens or public key infrastructures. In addition, the system may be readily implemented using web clients across multiple communication channels for mobile devices, non-mobile devices, voice activated devices or any other suitable devices.

Figure 28:
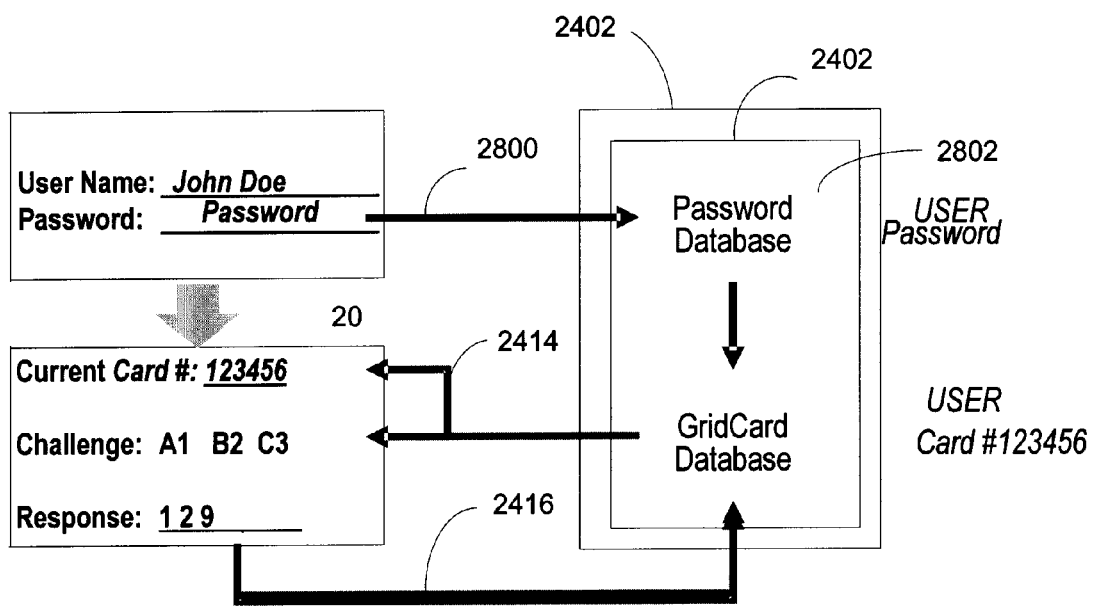
FIG. 28 is a block diagram illustrating one example of a device for providing mutual authentication between a user and a target resource in the form of a diagrammatical representation, in accordance with one embodiment of the invention.

FIG. 28 diagrammatically represents the operations described above. For example, as shown by communication 2800, a user is presented with a conventional user name and password login screen and enters their user name and password and sends it as a login response 2800 to the sender unit 2402 which then performs an authentication process, as known in the art, by comparing the received password and user ID to those stored in the password database 2802, for example. If validation is successful, the sender unit 2402 sends a challenge 2414 to a recipient unit with, for example, a user's card identifier and challenge which includes location information so that the user can locate specific indicia on the card. This challenge is, for example, displayed for the user on the recipient unit. The user confirms the received card identifier with the card identifier on the authentication card in the user's possession and answers the challenge by sending a reply 2416 back to the sender unit 2402. This reply is then validated by the sender unit to validate the user to complete mutual authentication. However, if the second level authentication is not successful, the sender unit will repeatedly send the same challenge, namely the same location information back to the recipient unit until a proper reply has been received.

Figure 29:
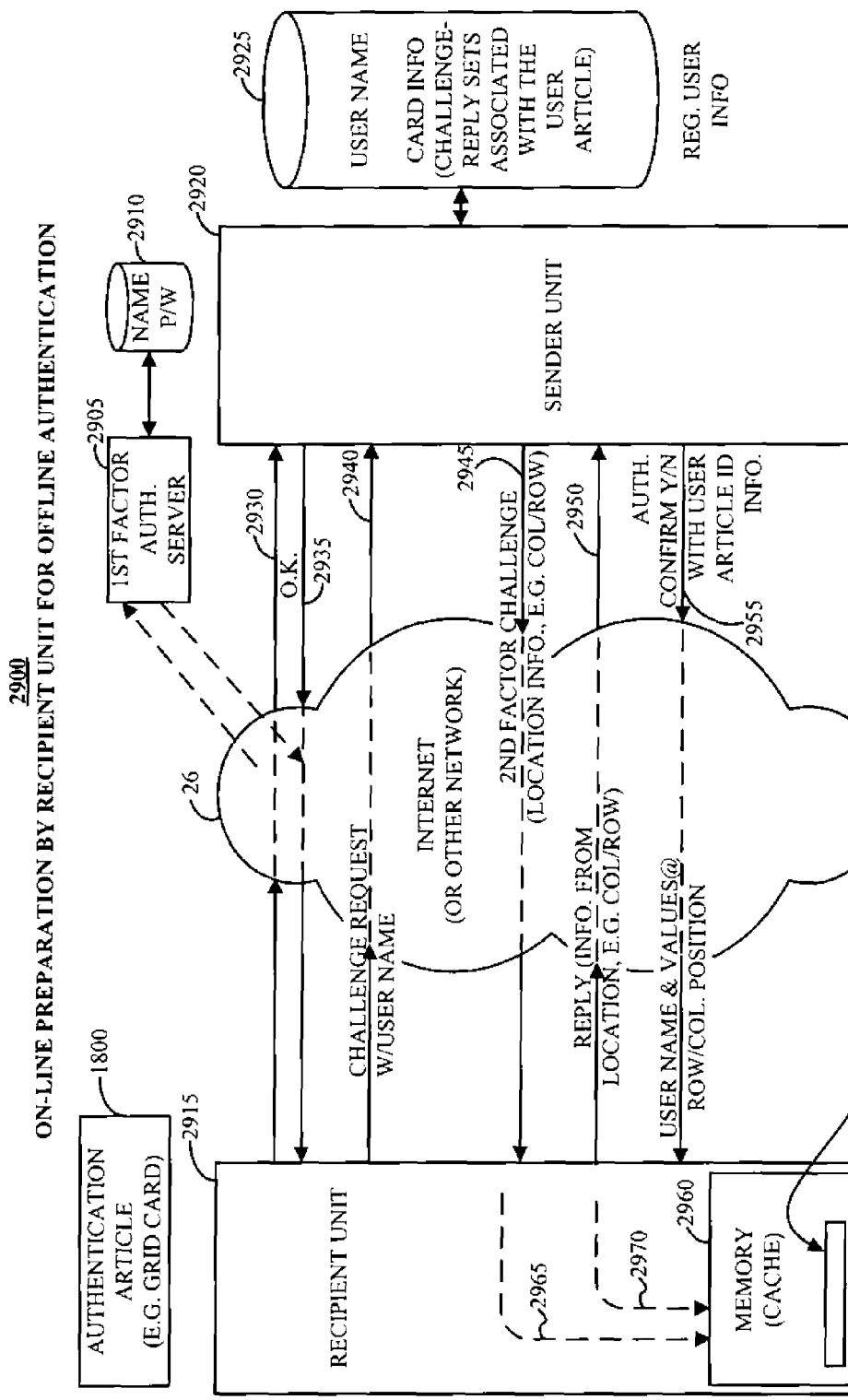
FIG. 29 is a block diagram illustrating one example of on-line storing of challenge-reply sets for off-line authentication of a user.

In FIG. 29, an alternative method of authenticating a user of a recipient unit is shown for when the user is off-line. When the user is on-line with a sender unit 2920 through a recipient unit 2915, one or a plurality of challenge-reply sets 2975 can be stored in memory 2960 of the recipient unit 2915. The memory 2960 may be any type of storage device that can store the challenge-reply set 2975. For example, the memory 2960 may include one or more magnetic or optical storage devices, or any other suitable memory device. The memory 2960 may be configured in any suitable manner such as a cache or non-cache memory. Each challenge-reply set 2975 is associated with an article 1800 based on prior on-line communications of the recipient unit 2915 with the sender unit 2920. Each challenge-reply set 2975 includes at least a challenge-reply pair 2965 and 2970, which is stored in the memory 2960 of the recipient unit 2915 during on-line authentication of the user so that a particular resource on the recipient unit 2915 is available to the user. When the user is off-line and if only one challenge-reply set 2975 is stored in the memory 2960, the stored challenge-reply set 2975 is selected for off-line authentication of the user for the particular resource available through the recipient unit 2915. When the user if off-line and a plurality of challenge-reply sets 2975 are stored in the memory 2960, at least one of the plurality of the stored challenge-reply sets 2975 is selected for off-line authentication of the user for the particular resource available through the recipient unit 2915.

The article 1800 by which the user can reply to challenges by the sender unit 2920 may be any one of the authentication articles that are described above with respect to the various embodiments of the present disclosure. For example, referring back to FIG. 18, the article 1800 may be a translucent or non-translucent film, sticker, card, or any other suitable article. It will be recognized that the information shown on the article 1800 is shown as one example only and it will be recognized that any suitable information may be used. In the example shown in FIG. 18, the article 1800 includes location information 1802 and 1804 (shown as row and column indicia) respectively and sender authentication information 1806 in the form of numbers that are addressable or locatable by the coordinate location information (e.g. row and column information). In addition, the article 1800 includes an optional article identifier 1808 such as a serial number generated (e.g. assigned) by the issuer of the article 1800. However, one of ordinary skill in the art will recognize that the article 1800 may be any one of the authentication articles described with respect to the various embodiments of the present disclosure, or any may take any suitable shape or form.

The sender unit 2920 which may be a suitable server in a network, node, or any other suitable device, may include one or more circuits which may be in the form of one or more processing devices that execute software instructions that are stored in memory, or may be implemented using discrete logic, or any suitable combination of hardware, software or firmware to carry out the operations described herein. As such, the sender unit 2920 includes circuits that are operative to carry out the steps as described above and in the following. The sender unit 2920 may communicate directly with the recipient unit 2915. Alternatively, the sender unit 2920 may also include a network interface for communicating either directly or through the Internet 26, an intranet, or any suitable network with the recipient unit 2915. The network interface may be operatively coupled to the processing device of the sender unit 2920.

The sender unit 2920 may also include memory that contains executable instructions that when executed by one or more processing devices operates as a first level user authenticator 2905 and a second level authenticator 2920. As noted above, it will be recognized however that these operations may be carried out by separate servers or other computing units located or accessible through the Internet 26, an intranet or any suitable network. It will also be recognized that the communications described herein may be communicated wirelessly for example where the recipient unit 2915 is a wireless handheld device or other suitable portable wireless device.

The recipient unit 2915 which may be a suitable server in a network, node, or any other suitable device, may include one or more circuits which may be in the form of one or more processing devices that execute software instructions that are stored in memory, or may be implemented using discrete logic, or any suitable combination of hardware, software or firmware to carry out the operations described herein. As such, the recipient unit 2915 includes circuits that are operative to carry out the steps as described above and in the following. The recipient unit 2915 may communicate directly with the sender unit 2920. Alternatively, the recipient unit 2915 may also include a network interface for communicating either directly or through the Internet 26, an intranet or any suitable network with the sender unit 2920. The network interface may be operatively coupled to the processing device of the recipient unit 2915.

The recipient unit 2915 may also include memory that contains executable instructions that when executed by one or more processing devices operates as a first level user authenticator 2406 and a second level authenticator 2408. As noted above, it will be recognized however that these operations may be carried out by separate servers or other computing units located or accessible through the Internet, an intranet or any suitable network. It will also be recognized that the communications described herein may be communicated wirelessly for example where the recipient unit 20 is a wireless handheld device or other suitable portable wireless device.

Referring to FIG. 29, when a user wishes to login to the recipient unit 2915 to use one or more resources of the recipient unit 2915, such as but not limited to software applications, device processes, peripheral devices, files, other stored data or any entity that requires authentication of a user prior to gaining access, a first level authentication process may be initially carried out. For example, this may include receiving user authentication information 2935 that may include, for example, a user password and user ID, from the recipient unit 2915, and hence the user. This is received, for example, by the first level user authenticator server 2905. The first level user authenticator server 2905 then authenticates the user based on the received user authentication information 2930 by using the user authentication information obtained, for example, from the database 2910. If they match, user authentication is successful and a second level authentication of the user may be carried out.

During the second level authentication process, the user may be provided with a number of challenges 2945, to which the user can provide a reply 2950 with the information contained on the article 1800. For a user that has been assigned the article 1800, a challenge can be requested from the sender unit 2920. The challenge may be a sender authentication challenge that may require a reply that contains information that can be found on the article 1800 in response to location information sent in a challenge. For example, the sender authentication information can be located on the article 1800 by a user by using the location information, such as row and column identifiers, or any other suitable location information as described above.

The challenge-reply set 2975 may include, as described in detail in the foregoing, second level user authentication, such as a challenge for the user that includes at least location information that identifies the desired sender authentication information that can be located on the article 1800. A challenge 2945 may include, for example, one or more coordinate sets that are for example, displayed to a user via the recipient unit 2915. The challenge 2945 may be particular to each user and must be retrieved, based on the identity or user authentication information from the first level user authentication process. The randomly generated challenge is then carried out and stored in the memory 2960 of the recipient unit 2915 once the user has successfully authenticated through a second level authentication process. Thus, when the user is on-line, one or a plurality of the challenge-reply sets 2975 are stored, i.e., stored, on the memory 2960 of the recipient unit 2915. The challenge 2945 may be sent in any suitable manner and may take any suitable form including, but not limited to, an SSL communication or non-secure communication if desired. The challenge 2945 may also be based on cryptographic information prior to being sent to the user. For example, the cryptographic information may be based on a hash function.

In addition to one or more challenge-reply pairs, each challenge-reply set may include user identification information, identification information of the article 1800, time entry data, a flag to indicate whether the stored challenge-reply set has been used off-line, the number of times the stored challenge-reply set has been used off-line, and/or an identification of the particular resource of the recipient unit that is accessible to the user upon completion of successful authentication of the user.

Figure 30:
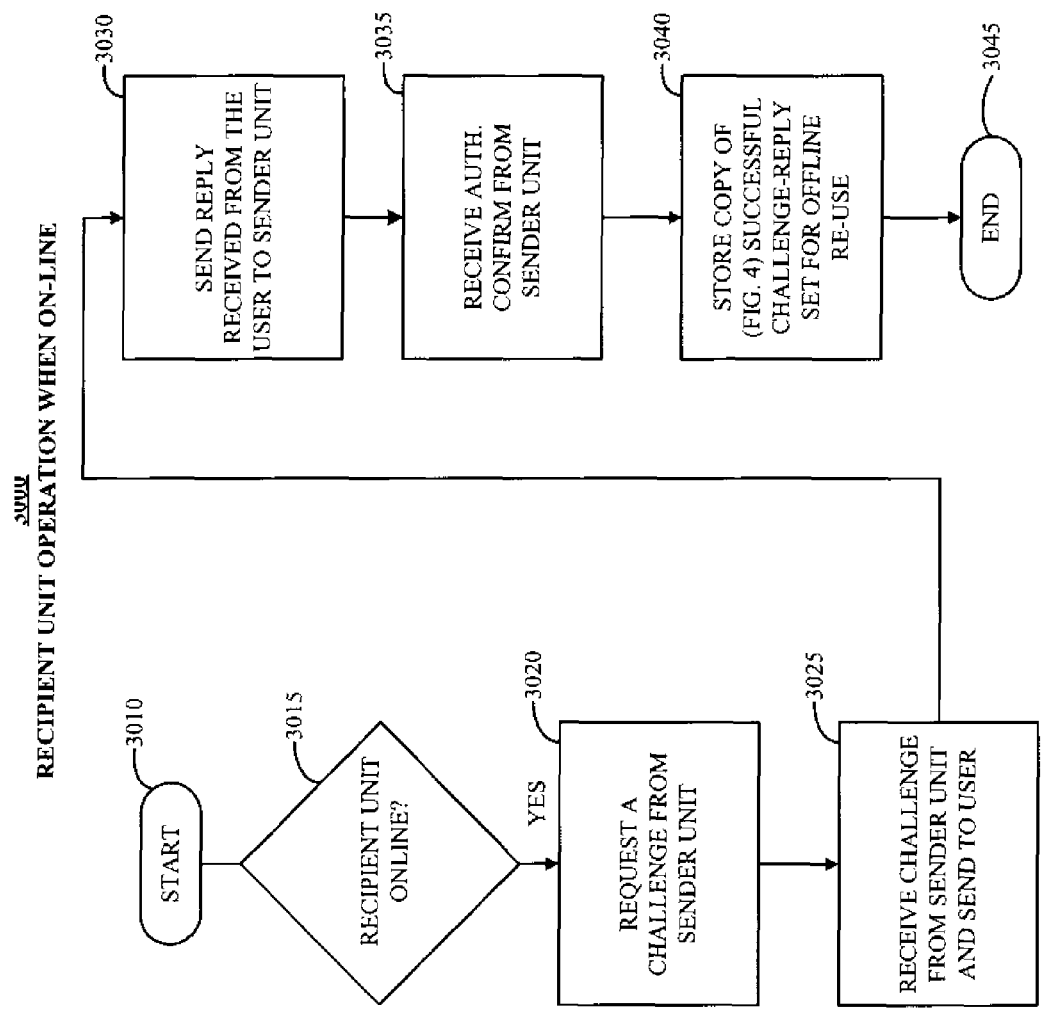
FIG. 30 is a flow chart illustrating an example of on-line authentication of a user and storing of challenge-reply sets when a recipient unit is online with a sender unit.

FIG. 30 illustrates the above-described method for providing mutual authentication between the recipient unit 2915 and the sender unit 2920, such as a target resource, wherein one or a plurality of challenge reply sets are stored in the recipient unit 2915. The disclosed method determines at block 3015 whether the user is on-line. If the user is on-line, the recipient unit 2915 requests a challenge from the sender unit 2920. The challenge is then sent to the user at block 3025. The user replies to the challenge as described in detail in the foregoing. At block 3030, the reply is sent to the sender unit 2920. The recipient unit 2915 receives confirmation of the authentication from the sender unit 2920 at block 3035. At block 3040, the recipient unit 2915 stores a copy of the challenge-reply set 2975 in the memory 2960 thereof for off-line re-use.

When a plurality of challenge-reply sets 2975 are to be stored in the memory 2960, each time the recipient unit 2915 attempts a successful login with the sender unit 2920 and completes a successful challenge-reply set, the recipient unit 2915 can store the successful challenge-reply set 2975 in the memory 2960 thereof. When only one challenge-reply set 2975 is to be stored in the memory 2960, each time the recipient unit 2915 attempts a successful login with the sender unit 2920 and completes a successful challenge-reply set, the recipient unit 2915 can store the challenge-reply set 2975 in memory. The storing of the challenge-reply set 2975 may entail overwriting the previous challenge-reply set 2975 stored in the memory 2960.

Alternatively, however, the challenge-reply sets 2975 that are stored in the memory 2960 may not be based on successful login attempts. Each time a user logs in to the recipient unit 2915 and the recipient unit 2915 is online with the sender unit 2920, the sender unit 2920 may send the recipient unit 2915 challenge-reply sets to store in the memory 2960 that are not based on a successful login of the user. For example, while the user is logged on to the sender unit 2920, one or a plurality of challenges and the corresponding replies based on the article 1800 that are not necessarily duplicative of any of the user's successful challenge-reply sets can be stored in the memory 2960.

The number of challenge-reply sets 2975 that may be stored in the memory 2960 may be predetermined and limited by either the user of the recipient unit 2915 or the sender unit 2920. For example, as described previously, only one challenge-reply set 2975 may be stored in the memory 2960 for off-line use. Accordingly, the user may be provided with only one off-line login to the recipient unit 2915. For example, if a plurality of challenge-reply sets 2975 are to be stored, a maximum number of ten successful challenge-reply sets 2975 may only be stored in the memory 2960 of the recipient unit 2915. When the number of challenge-reply sets 2975 stored in the memory 2960 of the recipient unit 2915 is at the predetermined maximum, the recipient unit 2915 may either stop storing additional challenge-reply sets 2975 into the memory 2960, or continue storing successful challenge-reply sets 2975 in the memory 2960 by overwriting the current stored challenge-reply sets 2975 so as to not exceed the predefined maximum number of challenge-reply sets 2975 that may be stored in the memory 2960. However, the number may not be predetermined and can be selected by the user through a suitable GUI interface from the recipient unit 2915.

Figure 31:
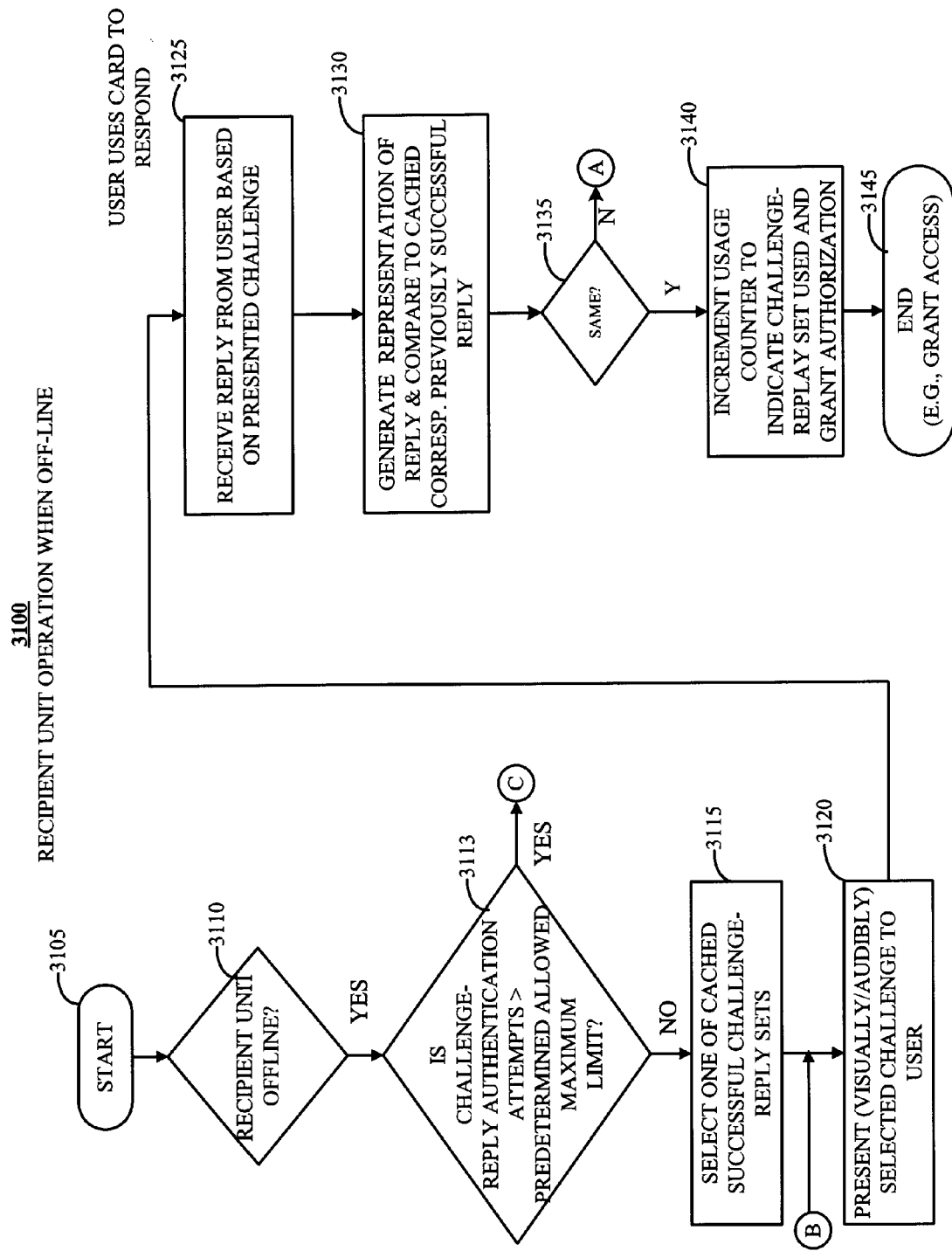
FIG. 31 is a flow chart illustrating an example of off-line authentication of a user when the recipient unit is off-line with the sender unit.
Figure 32:
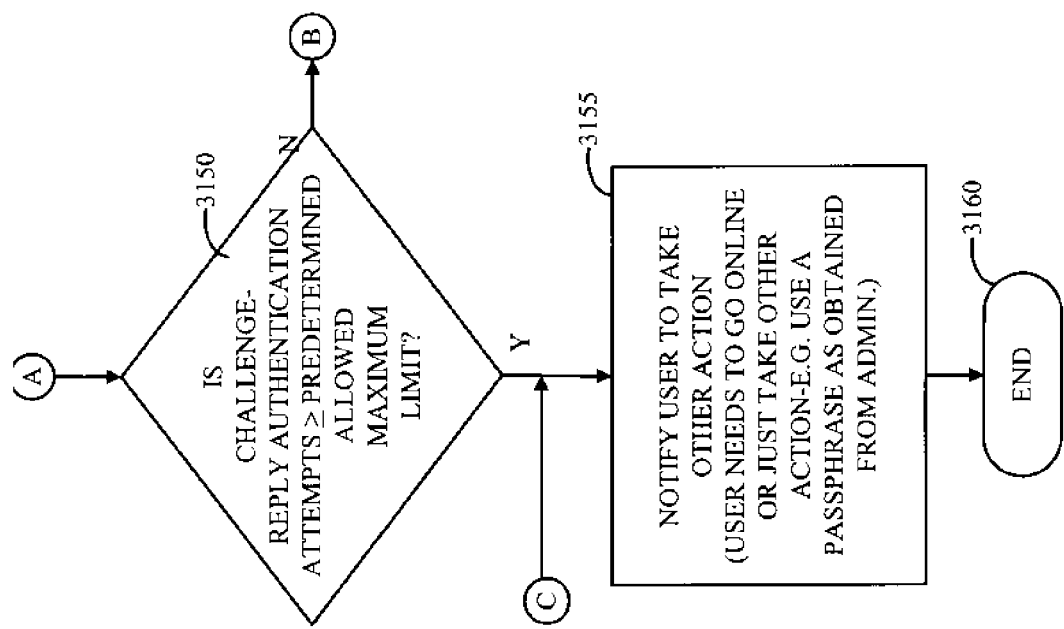
FIG. 32 is a flow chart illustrating an example of off-line authentication attempts based on a number of stored challenge reply sets during on-line authentication.

In FIG. 31, the method for providing a particular resource available through the recipient unit 2915 to the user when the user is off-line is described. At block 3110, the recipient unit 2915 determines whether the user is off-line or online. If the user is online, the recipient unit 2915 will follow the flow chart shown in FIG. 30 at block 3010. As described above, when a plurality of challenge-reply sets 2975 are stored in the memory 2960, the user of the recipient unit 2915 may be limited to only a predetermined number of logins to the sender unit 2920 when the user is off-line. Accordingly, if the recipient unit is off-line, the method will proceed to block 3113 where the recipient unit 2930 determines whether the challenge-reply authentication attempts are greater than or equal to the predetermined allowed maximum limit. If the challenge-reply authentication attempts are greater than or equal to the predetermined allowed maximum limit, the method will proceed to block 3155 of FIG. 32. If the challenge-reply authentication attempts are not greater than or equal to the predetermined allowed maximum limit, the method will proceed to block 3115 of FIG. 31 where the recipient unit will select one of the stored successful challenge-reply sets 2975 stored in the memory 2960 thereof. If only one challenge-reply set 2975 is stored in the memory 2960, the method may skip block 3113 and proceed directly from block 3110 to block 3115 where the recipient unit will select the stored challenge-reply set 2975 stored in the memory 2960. The recipient unit 2915 then allows the user to logon to the recipient unit 2915 based on one of the stored challenge-reply set 2975 in the memory 2960.

As shown in block 3120, the recipient unit 2915 presents to the user the selected challenge information from memory. The challenge information may be presented to the user visually and/or audibly on a display of the recipient unit 2915. The user responds to the challenge information by sending a reply as shown at block 3125. At block 3130, the user's reply is compared to the stored reply that corresponds to the challenge to which the user responded. As shown by the decision block 3135, if the user's reply to the challenge is the same as the stored reply, the user is granted access to the resources of the recipient unit 2915 as shown at block 3145. Because the user has used a successful challenge-reply set 2975, at block 3140, the recipient unit increments the usage counter, i.e. the number of times a challenge-reply set 2975 is used, to indicate challenge-reply set 2975 used and grant authorization. The maximum predetermined number of off-line authentication attempts may be assigned to a flag, i.e., a variable. If the challenge-reply authentication attempts are greater than the predetermined allowed maximum limit, i.e., the counter greater than the flag, at block 3155 the user is notified by the recipient unit 2915 to take other action. The other action may simply entail the user contacting the administrator of the sender unit 2920 to receive a passphrase to access the resources of the recipient unit 2915, as will be described in the following.

When a user successfully completes an online authentication, a random secret passphrase is generated by the sender unit 2920, optionally protected cryptographically (e.g., hashed), and automatically sent by the sender unit 2920 and stored in the memory 2960 of the recipient unit 2915 without the user's knowledge. The passphrase is also saved in the sender unit 2920 under the user's identification information along with the identity of the recipient unit 2915 on which the passphrase was also stored after a successful authentication. Should the user need to access the resources of the recipient unit 2915 but has exceeded the number of allowed offline authentication attempts, the user can contact the administrator of the sender unit 2920 to receive the passphrase. The user can then use the passphrase to access the recipient unit 2915 after the passphrase given to the user by the administrator of the sender unit 2920 and the passphrase stored in the recipient unit 2915 match.

Figure 33:
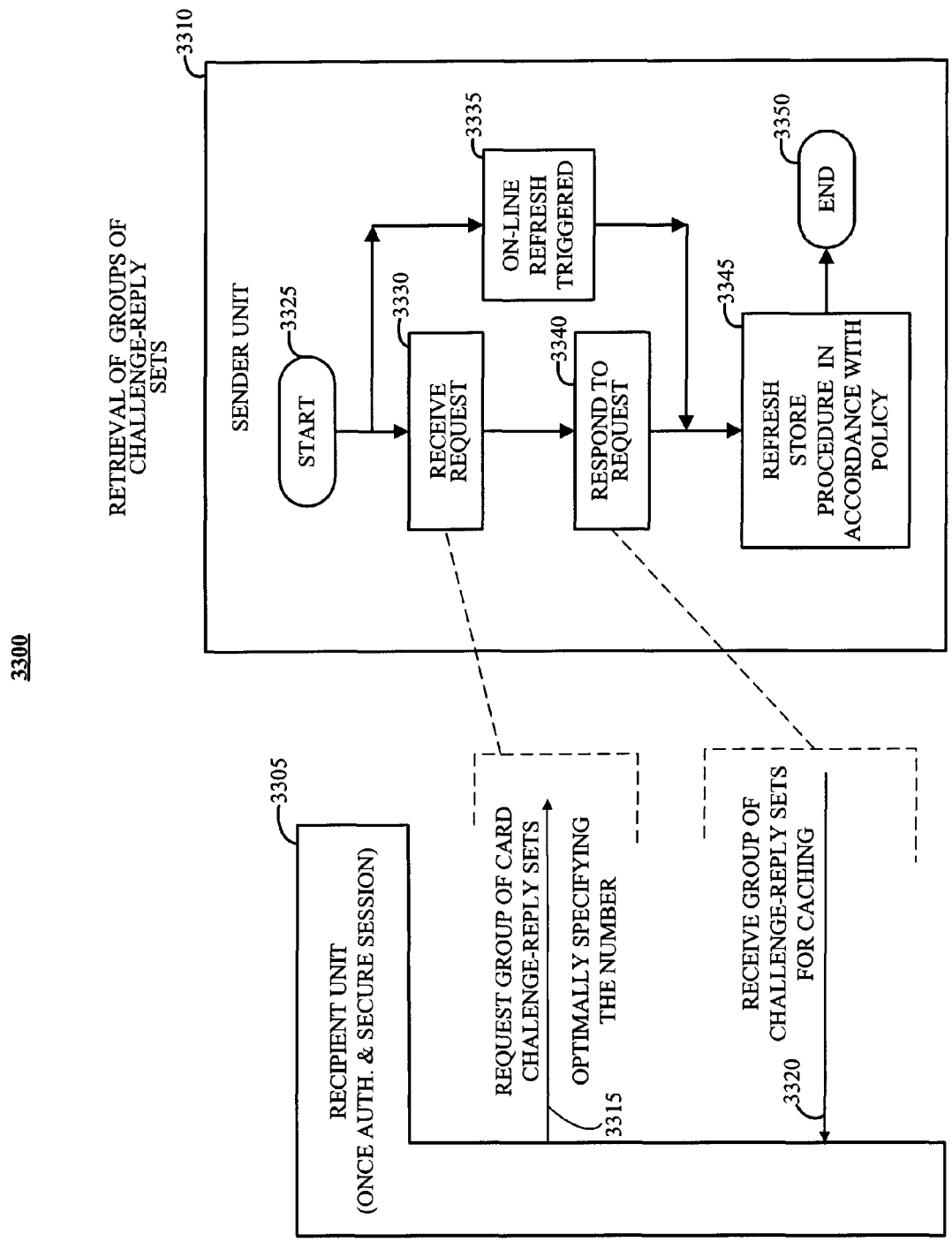
FIG. 33 is a block diagram illustrating one example of on-line storing of challenge-reply sets for off-line authentication of a user.

Referring to FIG. 33, another method of providing authentication of a user of a the recipient unit 2915 when the user is off-line is shown. In the method shown in FIG. 33, the recipient unit 2915 may not store successful challenge-reply sets 2975 into the memory 2916 each time the user is online with the sender unit 2920. In the method shown in FIG. 33, successful challenge-reply sets 2975 are stored in the recipient unit 2915 only when the user requests such storage of the challenge-reply sets 2975 into the memory 2960 of the recipient unit 2915. For example if the user knows that he will be using the recipient unit 2915 without being online with the sender unit 2920, prior to going off-line, the user can request a group of challenge-reply sets 2975 to be stored in the memory 2960 of the recipient unit 2915 as shown at block 3315 of FIG. 33. Such request is sent to the sender unit 2920 and received by the sender unit 2920 as shown by block 3330. The sender unit 2920 responds to the request by sending to the recipient unit a group of challenge-reply sets 2975 for storing into the memory 2960. As shown by block 3320 the recipient unit 3305 receives the challenge-reply sets 2975 and stores the challenge-reply sets 2975 in the memory 2960. Once the challenge-reply sets 2975 are stored in the memory 2960, the recipient unit 3305 can go off-line and the user is allowed to access the resources of the recipient unit 2915 while off-line by responding to the challenge-reply sets 2975 that are stored in the memory 2960 as described in detail in the foregoing. Each time such a request is made by a particular user of a recipient unit 2915, the sender unit 2920 triggers an on-line refresh of the receive request and respond to request procedures shown at blocks 3330 and 3340 in accordance with store laws implemented at block 3345 for such receive and respond requests.

The recipient unit 2915 may be used by a single user to access the sender unit 2920. The recipient unit 2915 may be any suitable device, such as but not limited to a laptop computer, a mobile phone, a PDA or an email device, that may be used offline such as when a user is traveling and cannot perform on-line authentication. When the user is on-line with the sender unit 2920, prior to the recipient unit 2915 storing a plurality of challenge-reply sets 2975 in the memory 2960 of the recipient unit 2915, the recipient unit 2915 clears (e.g., overwrites or removes data) a portion of the memory 2960 of recipient unit 2915 where a plurality of challenge-reply sets 2975 from a previous user had been stored. Accordingly each time a new user is on-line with the sender unit 2920, the recipient unit 2915 may clear the memory 2960 prior to storing the number of challenge-reply sets 2975 for the current user of the recipient unit 2915.

The recipient unit 2915 may be used by multiple users to access the sender unit 2920 when the recipient unit 2915 is offline. When each user is online with the sender unit 2920, the recipient unit 2915 stores a plurality of challenge-reply sets 2975 for that particular user in a segment of the memory 2960. Accordingly, challenge-reply sets 2975 for each user are stored in segments of the memory 2960 that is allocated to that user. Therefore, each segment of the memory 2960 cannot be overwritten with challenge-reply sets 2960 of another user. The recipient unit 2960 may also include multiple memories 2960 such that each memory 2960 is allocated to each user. When each user desires to use the resources of the recipient unit 2915 offline, the segment of the memory 2960 for that user is accessed and the second factor authentication of the user is performed as described herein. The administrator of the sender unit 2920 may select whether the recipient unit 2920 can be used offline by a single user or multiple users.

As described in the foregoing, the challenge-reply sets 2975 may be overwritten with new challenge-reply sets 2975. This occurs, for example, when the number of stored challenge-reply sets 2975 is at the maximum allowed limit and any additional challenge-reply sets overwrite the stored challenge-reply sets 2975. When the recipient unit 2915 overwrites a stored challenge-reply set 2975 for the reasons described in the foregoing, the replacing of the stored challenge-reply set 2975 may be based on randomly replacing the challenge-reply sets 2975 in the memory 2960, replacing the oldest challenge-reply set 2975, replacing the newest challenge-reply set 2975, replacing the most used challenge-reply set 2975, and/or replacing the least used challenge-reply set 2975.

When the user is being authenticated for off-line use of the recipient unit 2915, one or more of the stored challenge-reply sets 2975 stored in the memory 2960 of the recipient unit 2915 may be used for the authentication. The present disclosure provides for selection of the challenge-reply sets 2975 for off-line authentication based on randomly selecting, selecting the oldest, selecting the newest, selecting the most used, and/or selecting the least used of the stored challenge-reply sets 2975.

To provide the above-described functionality of the recipient unit 2915 for off-line authentication of the user, a set of executable instructions or a software program may be stored on the recipient unit 2915 that when executed provides the above-described functionality. An example list of the functionality provided by the software program may be as follows: provide the connectivity with the sender unit 2920 when the user is online to receive challenge-reply sets 2975 for off-line authentication, keep track of the number of attempted off-line authentications of the user by incrementing a flag variable when an off-line authentication is attempted, selecting the stored challenge-reply sets 2975 for off-line authentication based on any one of the methods described above, and/or managing different users off-line and online authentication with the recipient unit 2920.

The number of challenge-reply sets 2975 stored in memory 2960 is typically less than all possible challenge-reply sets 2975 from the article 1800. Under certain circumstances, the administrator of the sender unit 2920 may wish to allow the user of the recipient unit 2915 to access the recipient unit as many times as desired when the recipient unit is off-line. Accordingly, the number of challenge-reply sets 2975 available in the memory 2960 of the recipient unit 2915 may not be limited to a predetermined number of challenge-reply sets 2975. Under such circumstances, when the recipient unit logs into the sender unit 2920, all possible challenge-reply sets 2975 from the article 1800 or a subset thereof may be stored in the memory 2960 of the recipient unit 2915. When a user attempts to use the resources of the recipient unit 2915 when the recipient unit 2915 is off-line, a challenge-reply set 2975 is generated for the user of the recipient unit 2915 based on one of all possible combinations of challenge-reply sets 2975 based on the article 1800. Accordingly, the above-described software program of the recipient unit 2915 may provide the on-line challenge and reply procedure as described in the foregoing to authenticate the user based on all the stored challenge-reply sets 2975 from the article 1800. However, when another user uses the recipient unit 2915 and logs into the sender unit 2920 and is online with the sender unit 2920 through a network or by communicating with the sender unit 2920, all challenge-reply sets 2975 that were stored in the memory 2960 of the recipient unit 2915 will be automatically removed (e.g., cleared or overwritten) by the recipient unit 2915 so that all of less than all challenge-reply sets 2975 for the new user based on the article 1800 of the new user can be stored in the memory 2960.

The sender unit 2920 may include a Graphic User Interface (GUI) that allows the administrator of the sender unit 2920 to determine a desired offline authentication security scheme on a per user or group basis. For example, the GUI may include pull down menus to allow the administrator of the sender unit 2920 to select one of a number of offline authentication security schemes to send to the recipient unit 2915 in response to a request from the recipient unit 2915. The security schemes that can be selectable by the administrator of the sender unit 2920 may include the number of challenge-reply sets 2975 that can be stored on the memory 2960 of the recipient unit 2915. Additionally, the security schemes that can be selectable by the administrator of the sender unit 2920 may include the types of challenge-reply sets 2975 that can be stored on the memory 2960 of the recipient unit 2915. For example, the GUI of the sender unit 2920, may include a pull down menu, by which the administrator of the sender unit 2920 can select the security scheme to send to the recipient unit 2915. The selectable security schemes may include the recipient unit 2915 storing online previously successful challenge-reply sets 2975, sending to the recipient unit 2915 a predetermined number of challenge-reply sets 2975, all of the possible challenge-reply sets 2975 that may be available on the article 1800, or less than all of the possible challenge-reply sets 1800 that may be available on the article 1800.

As described above, the method and apparatus provides a second factor authentication for a recipient unit 2915 when the recipient unit 2915 is offline relative to a sender unit 2920. The method and apparatus enables a recipient unit 2915 to respond to a unique, one-time authentication challenge issued by a sender unit 2920, which may be an authentication server 2905, when the recipient unit 2915 is not connected to a network and cannot access the authentication server 2905.

The method and apparatus provides a secure method of offline authentication using a dynamic one-time challenge-reply sets 2975 while the sender unit 2920 is unavailable to the recipient unit 2915. The method and apparatus does not have an inherent expiry based on time. The user can remain offline for undetermined periods of time while still allowing for the authentication method to function. Additionally, the recipient unit 2915 can automatically take all the necessary steps to prepare for offline authentication. Accordingly, should the sender unit 2920 inadvertently go offline because of network failures or other reasons, the offline authentication method allows for the user to continue to use second factor to authentication. Even if the sender unit 2920 goes offline, the security policies of an organization that employs the present method and system are still enforced and two-factor authentication is maintained on the recipient unit 2915. Other advantages will be recognized by those of ordinary skill in the art.

It is therefore contemplated that the present invention cover any and all modifications, variations or equivalents that fall within the spirit and scope of the basic underlying principles disclosed above and claimed herein. For example, the methods need not be used with two levels of authentication but may serve as a single level of authentication.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A method for providing authentication of a user of a recipient unit, comprising:
   during on an online communication between a sender unit and the recipient unit, storing, by the recipient unit, at least one challenge-reply set associated with an article, the at least one challenge-reply set including at least a challenge-reply pair for use in off-line authentication of the user for a particular resource available through the recipient unit;
   during an off-line condition of the recipient unit, selecting, by the recipient unit, for off-line authentication of the user for the particular resource available through the recipient unit, the at least one stored challenge-reply set; and
   authenticating the user, by the recipient unit, during the off-line condition using the selected stored challenge and corresponding stored reply from the stored challenge-reply set.

2. The method according to claim 1, wherein storing the at least one challenge-reply set comprises storing, by the recipient unit, at least one challenge-reply set for each user of a plurality of users of the recipient unit based on online communication of each user with the sender unit, wherein the at least one challenge-reply set corresponding to each user is selected for off-line authentication of each user for the particular resource available through the recipient unit.

3. The method according to claim 1, wherein storing the at least one challenge-reply set comprises storing at least one challenge-reply set in cache memory.

4. The method according to claim 1, wherein the recipient unit is a wireless communication device.

5. The method according to claim 1, wherein the challenge-reply pair is based on a successful challenge and reply.

6. The method according to claim 1, wherein the challenge is based on sender authentication information that can be located on the article by using location information.

7. The method according to claim 6, wherein the number of stored challenge-reply sets is less than all possible challenge-reply sets available on the article.

8. The method according to claim 6, wherein the challenge identifies the location information as row and column information on a card.

9. The method according to claim 1, wherein the stored challenge-reply set includes, in addition to the challenge-reply pair, data representing at least one of: user identification information, article identification information, time entry data, a flag to indicate whether the stored challenge-reply set has been used off-line, a number of times the stored challenge-reply set has been used off-line, and an identification of the particular resource of the recipient unit accessible to the user upon completion of a successful authentication of the user.

10. The method according to claim 1, wherein the at least one stored challenge-reply set is based on a cryptographic transformation.

11. The method according to claim 10, wherein the cryptographic transformation is based on a hash function.

12. The method according to claim 1, wherein storing the at least one challenge-reply set comprises clearing the stored challenge-reply set and storing at least one new challenge-reply set upon receiving from the sender unit a confirmation of authentication of the user with article identification information different from the article identification information stored in the recipient unit.

13. The method according to claim 1, comprising storing a plurality of challenge-reply sets associated with the article during the online communication with the sender unit, wherein selecting comprises selecting at least one of the plurality of challenge-reply sets for off-line authentication of the user.

14. The method according to claim 13, wherein storing the plurality of challenge-reply sets comprises replacing a stored challenge-reply set when attempting to add a challenge-reply set to a number of stored challenge-reply sets already having a predefined maximum number of challenge-reply sets.

15. The method according to claim 13, wherein storing the plurality of challenge-reply sets comprises replacing a stored challenge-reply set based on at least one of: randomly replacing, replacing the oldest, replacing the newest, replacing the most used, and replacing the least used.

16. The method according to claim 13, wherein storing the plurality of challenge-reply sets comprises requesting any one of a group of challenge-reply sets from the sender unit and storing the group in response to receiving the group.

17. The method according to claim 13, wherein storing the plurality of challenge-reply sets comprises requesting from the sender unit all possible challenges and corresponding replies associated with the article, and upon receiving from the sender unit all the challenges and corresponding replies associated with the article, storing all the challenges and corresponding replies associated with the article.

18. The method according to claim 13, wherein selecting is based on at least one of: randomly selecting, selecting the oldest, selecting the newest, selecting the most used, and selecting the least used of the at least one of the plurality of stored challenge-reply sets.

19. The method according to claim 1, comprising providing a first level of authentication prior to selecting the at least one stored challenge-reply set for further authentication of the user.

20. A method for providing off-line authentication of a user of an off-line recipient unit, comprising:
   during an off-line condition, selecting, by the off-line recipient unit, for off-line authentication of the user for a particular resource available through the off-line recipient unit, at least one of a plurality of stored challenge-reply sets;
   providing an off-line challenge using a selected challenge from a selected stored challenge reply set;
   receiving, by the off-line recipient unit, a reply from the user corresponding to the off-line challenge;
   comparing, by the off-line recipient unit, the received reply to a stored reply corresponding to the selected challenge-reply set for a match; and
   approving, by the off-line recipient unit, authentication of the user upon matching the received reply to the stored reply corresponding to the challenge for the selected at least one of the plurality of stored challenge-reply sets.

21. The method according to claim 20, wherein approving authentication of the user includes incrementing a usage counter of the recipient unit for each of the selected at least one of the plurality of stored challenge-reply sets.

22. The method according to claim 20, wherein selecting is based on at least one of: randomly selecting, selecting the oldest, selecting the newest, selecting the most used, and selecting the least used, of the at least one of the plurality of stored challenge-reply sets.

23. The method according to claim 20, wherein the challenge is based on sender authentication information that can be located on an article by using location information.

24. The method according to claim 23, wherein the number of stored challenge-reply sets is less than all possible challenge-reply sets available on the article.

25. The method according to claim 23, wherein the challenge identifies the location information as row and column information on a card.

26. A recipient unit for use by a user, comprising:
at least one processor; and
at least one memory device, coupled to the at least one processor, having stored therein executable instructions that, when executed by the at least one processor, cause the at least one processor to:
store, based on an online communication with the sender unit, at least one previously successful challenge-reply set associated with an article, the stored previously successful online challenge-reply set including at least a challenge-reply data pair for use in off-line authentication of the user for a particular resource available through the recipient unit;
select, by the recipient unit, for off-line authentication of the user for the particular resource available through the recipient unit, the at least one stored previously successful online challenge-reply set; and
authenticate the user, by the recipient unit, during the off-line condition using the selected stored challenge and corresponding stored reply from the stored challenge-reply set.

27. The recipient unit of claim 26, wherein storing the at least one challenge-reply set comprises storing at least one challenge-reply set for each user of a plurality of users of the recipient unit based on online communication of each user with the sender unit, wherein the at least one challenge-reply set corresponding to each user is selected for off-line authentication of each user for the particular resource available through the recipient unit.

28. The recipient unit of claim 26, wherein storing the at least one challenge-reply set comprises storing at least one challenge-reply set in cache memory.

29. The recipient unit of claim 26, wherein the recipient unit is a wireless communication device.

30. The recipient unit of claim 26, wherein the challenge-reply pair is based on a successful challenge and reply.

31. The recipient unit of claim 26, wherein the challenge is based on sender authentication information that can be located on the article by using location information.

32. The recipient unit of claim 31, wherein the number of stored challenge-reply sets is less than all possible challenge-reply sets available on the article.

33. The recipient unit of claim 31, wherein the challenge identifies the location information as row and column information on a card.

34. The recipient unit of claim 26, wherein the stored challenge-reply set includes, in addition to the challenge-reply pair, data representing at least one of: user identification information, article identification information, time entry data, a flag to indicate whether the stored challenge-reply set has been used off-line, a number of times the stored challenge-reply set has been used off-line, and an identification of the particular resource of the recipient unit accessible to the user upon completion of a successful authentication of the user.

35. The recipient unit of claim 26, wherein the at least one stored challenge-reply set is based on a cryptographic transformation.

36. The recipient unit of claim 35, wherein the cryptographic transformation is based on a hash function.

37. The recipient unit of claim 26, wherein storing the at least one challenge-reply set comprises clearing the stored challenge-reply sets and storing at least one new challenge-reply set upon receiving from the sender unit a confirmation of authentication of the user with article identification information different from the article identification information stored in the recipient unit.

38. The recipient unit of claim 26, comprising storing a plurality of challenge-reply sets associated with the article, wherein the selecting comprises selecting at least one of the plurality of challenge-reply sets.

39. The recipient unit of claim 38, wherein storing the plurality of challenge-reply sets comprises replacing a stored challenge-reply set when attempting to add a challenge-reply set to a number of stored challenged-reply sets already having a predefined maximum number of challenge-reply sets.

40. The recipient unit of claim 38, wherein storing the plurality of challenge-reply sets comprises replacing a stored challenge-reply set based on at least one of: randomly replacing, replacing the oldest, replacing the newest, replacing the most used, and replacing the least used.

41. The recipient unit of claim 38, wherein storing the plurality of challenge-reply sets comprises requesting any one of a group of challenge-reply sets from the sender unit and storing the group in response to receiving the group.

42. The recipient unit of claim 38, wherein storing the plurality of challenge-reply sets comprises requesting from the sender unit all possible challenges and corresponding replies associated with the article, and upon receiving from the sender unit all the challenges and corresponding replies associated with the article, storing all the challenges and corresponding replies associated with the article.

43. The recipient unit of claim 38, wherein selecting is based on at least one of:
randomly selecting, selecting the oldest, selecting the newest, selecting the most used, and selecting the least used of the at least one of the plurality of stored challenge-reply sets.

44. The recipient unit of claim 26, wherein the at least one processor provides a first level of authentication prior to selecting at least one of the plurality of stored challenge-reply sets for further authentication of the user.

45. A recipient unit for use by a user, comprising:
at least one processor; and
at least one memory device coupled to the at least one processor and having stored thereon executable instructions that when executed by the at least one processor cause the at least one processor to:
select, for off-line authentication of the user for a particular resource available through the recipient unit, at least one of a plurality of stored challenge-reply sets;
provide an off-line challenge using a selected challenge from a selected stored challenge-reply set;
receive a reply from the user corresponding to the off-line challenge;
compare the received reply to a stored reply corresponding to the selected challenge-reply set for a match; and
approve authentication of the user upon matching the received reply to the stored reply corresponding to the off-line challenge for the selected at least one of the plurality of stored challenge-reply sets.

46. The recipient unit of claim 45, wherein approving authentication of the user includes incrementing a usage counter for each of the selected at least one of the plurality of stored challenge-reply sets.

47. The recipient unit of claim 45, wherein selecting includes selecting based on at least one of selecting randomly, selecting the oldest, selecting the newest, selecting the most used, and selecting the least used of the at least one of a plurality of stored challenge-reply sets.

48. The recipient unit of claim 45, wherein the executable instructions when executed by the at least one processor cause the at least one processor to:
- select at least one of a plurality of stored challenge-reply sets;
- receive a reply for each of the selected at least one of the plurality of stored challenge-reply sets; and
- approve authentication of the user upon matching the received reply to the stored reply corresponding to the sent challenge for the each of the selected at least one of the plurality of stored challenge-reply sets.

49. The recipient unit of claim 48, wherein approving authentication of the user includes incrementing a usage counter for each of the selected at least one of the plurality of stored challenge-reply sets.

50. The recipient unit of claim 48, wherein selecting includes selecting based on at least one of selecting randomly, selecting the oldest, selecting the newest, selecting the most used, and selecting the least used of the at least one of a plurality of stored challenge-reply sets.

51. A recipient unit for use by a user, comprising:
- at least one processor; and
- at least one memory device coupled to the at least one processor and having stored thereon executable instructions that when executed by the at least one processor cause the at least one processor to:
  - store at the recipient unit prior successful challenge-reply sets used in authenticating the user when the recipient unit was previously online with a sender unit; and
  - authenticate the user, by the recipient unit, when the recipient unit is off-line from the sender unit using the stored prior successful online challenge-reply sets.

52. The recipient unit of claim 51, wherein a secret passphrase is used to authenticate the user of the recipient unit when the recipient unit is off-line and challenge-reply authentication attempts exceed a predetermined maximum.

53. The recipient unit of claim 51, wherein the challenge is based on sender authentication information that can be located on an article by using location information.

54. The recipient unit of claim 53, wherein the challenge identifies the location information as row and column information on a card.

* * * * *